United States Patent
Lester et al.

(10) Patent No.: US 9,540,460 B2
(45) Date of Patent: Jan. 10, 2017

(54) PREPARATION OF POLYOLEFIN

(71) Applicant: Univation Technologies, LLC, Houston, TX (US)

(72) Inventors: C. Dale Lester, Fayetteville, WV (US); Kevin J. Cann, Rock Hill, NJ (US); Phuong A. Cao, Old Bridge, NJ (US); Abarajith S. Hari, Ridgecrest, CA (US); F. David Hussein, Cross Lanes, WV (US); Wesley R. Mariott, Pearland, TX (US); John H. Moorhouse, Kendall Park, NJ (US); Richard B. Pannell, Kingwood, TX (US); Bruce J. Savatsky, Kingwood, TX (US); Daniel P. Zilker, Jr., Charleston, WV (US); Mark G. Goode, Hurricane, WV (US)

(73) Assignee: Univation Technologies, LLC, Houston, TX (US)

( * ) Notice: Subject to any disclaimer, the term of this patent is extended or adjusted under 35 U.S.C. 154(b) by 0 days.

(21) Appl. No.: 14/765,405

(22) PCT Filed: Nov. 20, 2013

(86) PCT No.: PCT/US2013/071020
§ 371 (c)(1),
(2) Date: Aug. 3, 2015

(87) PCT Pub. No.: WO2014/123598
PCT Pub. Date: Aug. 14, 2014

(65) Prior Publication Data
US 2015/0368377 A1     Dec. 24, 2015

Related U.S. Application Data

(60) Provisional application No. 61/762,061, filed on Feb. 7, 2013.

(51) Int. Cl.
| | | |
|---|---|---|
| *C08F 210/16* | (2006.01) | |
| *C08F 4/6592* | (2006.01) | |
| *C08F 10/14* | (2006.01) | |
| *C08F 4/659* | (2006.01) | |

(52) U.S. Cl.
CPC ............ *C08F 10/14* (2013.01); *C08F 4/65916* (2013.01); *C08F 210/16* (2013.01); *C08F 4/65925* (2013.01)

(58) Field of Classification Search
CPC .. C08F 4/65916; C08F 4/65925; C08F 210/16
See application file for complete search history.

(56) References Cited

U.S. PATENT DOCUMENTS

| | | |
|---|---|---|
| 2006/0293470 A1 | 12/2006 | Cao et al. |
| 2011/0086990 A1 | 4/2011 | Graham et al. |
| 2012/0289667 A1 | 11/2012 | Lukesova et al. |
| 2013/0035463 A1 | 2/2013 | Cann et al. |
| 2013/0253153 A1 | 9/2013 | Pequeno et al. |

*Primary Examiner* — Caixia Lu
(74) *Attorney, Agent, or Firm* — Brooks, Cameron & Huebsch, PLLC

(57) ABSTRACT

Catalyst systems and methods for making and using the same are provided. The catalyst systems can include a plurality of silica particles and a metallocene catalyst and an activator supported on the plurality of silica particles. The polymerization catalysts have a particle size distribution in which about 10% of the particles have a size less than about 17 to about 23 micrometers, about 50% of the particles have a size less than about 40 to about 45 micrometers, and about 90% of the particles have a size less than about 72 to about 77 micrometers.

12 Claims, 13 Drawing Sheets

100

600

800

900

PREPARATION OF POLYOLEFIN

This application is a National Stage Application under 35 U.S.C. §371 of International Application Number PCT/US2013/071020, filed Nov. 20, 2013 and published as WO 2014/123598 on Aug. 14, 2014, which claims the benefit to U.S. Provisional Application 61/762,061, filed Feb. 7, 2013 the entire contents of which are incorporated herein by reference in its entirety.

BACKGROUND

Ethylene alpha-olefin (polyethylene) copolymers are typically produced in a low pressure reactor, utilizing, for example, solution, slurry, or gas phase polymerization processes. Polymerization takes place in the presence of catalyst systems such as those employing, for example, a Ziegler-Natta catalyst, a chromium based catalyst, a metallocene catalyst, or combinations thereof.

A number of catalyst compositions containing single site, e.g., metallocene catalysts have been used to prepare polyethylene copolymers, producing relatively homogeneous copolymers at good polymerization rates. In contrast to traditional Ziegler-Natta catalyst compositions, single site catalyst compositions such as metallocene catalysts are catalytic compounds in which each catalyst molecule contains one or only a few polymerization sites. Single site catalysts often produce polyethylene copolymers that have a narrow molecular weight distribution. Although there are single site catalysts that can produce broader molecular weight distributions, these catalysts often show a narrowing of the molecular weight distribution as the reaction temperature is increased, for example, to increase production rates. Further, a single site catalyst will often incorporate comonomer among the molecules of the polyethylene copolymer at a relatively uniform rate. The molecular weight distribution and the amount of comonomer incorporation can be used to determine a composition distribution.

For use in a reactor, a single site catalyst and other activators, such as methylaluminoxane ("MAO"), are often supported on solid materials. These materials include spherical silica particles, among other materials and conformations.

SUMMARY

An embodiment described herein provides a method for making a supported polymerization catalyst. The method includes forming a catalyst compound comprising hafnium and mixing the catalyst with an activator to form a catalyst complex. The catalyst complex is combined with a silica support to form a supported catalyst. The supported catalyst is dried to bind the catalyst complex to the silica support. The supported catalyst produces polymer that has an average particle size of greater than about 0.660 mm (0.0260 in), an average productivity of greater than about 7000 g resin/g catalyst, and forms a distribution of resin particles sizes with about 20% of resin particles having a size larger than about 1 mm.

Another embodiment provides a method for making a supported polymerization catalyst that includes forming a catalyst comprising bis(n-propylcyclopentadienyl) hafnium $(CH_3)_2$. The catalyst is mixed with methylaluminoxane to form a catalyst complex. The catalyst complex is combined with a silica support to form a supported catalyst. The supported catalyst is dried to bind the catalyst complex to the silica support. The supported catalyst forms polymer that has an average particle size of greater than about 0.762 mm (0.03 in), has an average productivity of greater than about 7000 g resin/g catalyst, and forms a distribution of resin particles having about 20% with a size larger than about 1 mm.

Another embodiment provides a method for forming polymers. The method includes forming a supported hafnium catalyst. The supported hafnium catalyst has a productivity of at least about 7000 g polymer per g catalyst. The supported catalyst is reacted with at least ethylene in a fluidized bed reactor to form resin particles, wherein the resin particles have an average polymer particle size of at least about 0.762 mm (0.0300 in), a size distribution of at least about 20% greater than 1 mm in diameter, and a ratio of fluidized bulk density to settled bulk density (FBD/SBD) of greater than about 0.570.

Another embodiment provides a polymerization catalyst for forming a polyethylene copolymer. The polymerization catalyst includes a plurality of silica particles and a metallocene catalyst and an activator supported on the plurality of silica particles. The polymerization catalyst has a particle size distribution in which about 10% of the particles have a size less than about 17 to about 23 micrometers, about 50% of the particles have a size less than about 40 to about 45 micrometers, and about 90% of the particles have a size less than about 72 to about 77 micrometers. The polymerization catalyst has a melt-flow ratio response at about 77° C. of about 26 and, at about 75° C., of about 28.

Yet another embodiment provides a polymerization catalyst for forming a polyethylene copolymer. The polymerization catalyst includes a plurality of silica particles and a hafnium catalyst and an activator supported on the plurality of silica particles. The polymerization catalyst has a particle size distribution in which about 10% of the particles have a size less than about 17 to about 23 micrometers, about 50% of the particles have a size less than about 40 to about 45 micrometers, and about 90% of the particles have a size less than about 72 to about 77 micrometers, and wherein the polymerization catalyst forms a polymer bed having a ratio of fluidized bulk density to settled bulk density (FBD/SBD) of greater than about 0.570.

DETAILED DESCRIPTION

Figure 1:
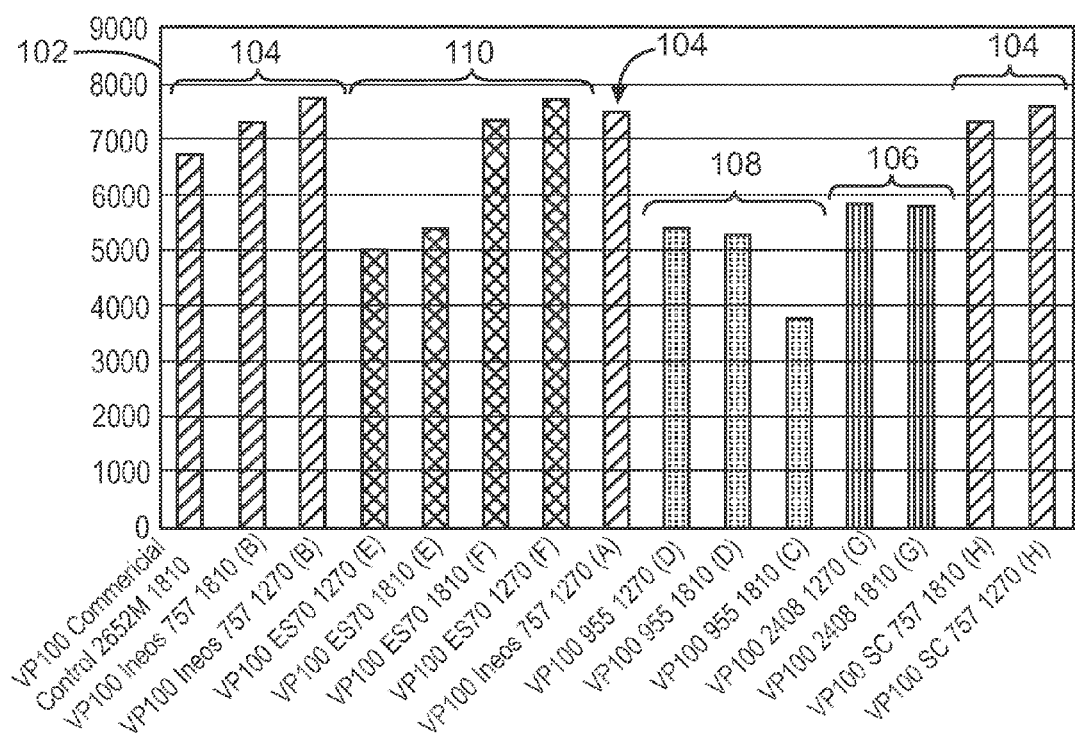
FIG. 1 is a bar chart illustrating productivities of catalysts on different spherical silica supports.

For gas phase reactors, spherical silica particles may be used as catalyst supports. For example, spherical silica particles that have an average diameter of around 25 micrometers (μm) may be used. Using a hafnium based metallocene catalyst, bis(propylcyclopentadienyl) hafnium dimethyl, (termed "HfP" herein), this size of support produces a resin with an average particle size (APS) of about 580 μm. Past studies with larger sizes of supports produced larger particles, but also indicated that the larger supports produced lower catalyst productivity.

Alternate catalyst silica supports for HfP were evaluated, as well as other catalyst supports. This study was initiated to determine if a larger resin particle size could be achieved without a loss of productivity. Several supports tested, e.g. 2408 and 955 from Grace Davison, and ES 70 from PQ corporation had a larger average particle size and produced polymer at larger average particle sizes. However, most of the supports tested produced polymer at lower productivities and with a worse melt flow response, as described herein.

In contrast, one of the supports tested, ES 70 from PQ Corporation, produced polymer at a similar productivity and similar melt flow response to a control catalyst supported on ES757, which is a smaller support from PQ Corporation. Further, the catalyst supported on the ES 70 had a larger ratio of fluidized bulk density to settled bulk density ratio. This indicates the catalyst on this support will have a broader operating window, ensuring better fluidization in the reactor bed.

Various catalyst systems and components may be used to generate the polymers and molecular weight compositions disclosed. These are discussed in the sections to follow. The first section discusses catalyst compounds that can be used in embodiments, including Metallocene catalysts, among others. The second section discusses generating catalyst slurries that may be used for implementing the techniques described. The third section discusses supports that may be used. The fourth section discusses catalyst activators that may be used. Gas phase polymerizations may use static control or continuity agents, which are discussed in the fifth section. A gas-phase polymerization reactor is discussed in the sixth section. The use of the catalyst composition to control product properties is discussed in a sixth section and an exemplary polymerization process is discussed in the seventh section. Examples of the implementation of the procedures discussed are incorporated into an eighth section.

Catalyst Compounds

Metallocene Catalyst Compounds

Metallocene catalyst compounds are generally described throughout in, for example, 1 & 2 METALLOCENE-BASED POLYOLEFINS (John Scheirs & W. Kaminsky eds., John Wiley & Sons, Ltd. 2000); G. G. Hlatky in 181 COORDINATION CHEM. REV. 243-296 (1999) and in particular, for use in the synthesis of polyethylene in 1 METALLOCENE-BASED POLYOLEFINS 261-377 (2000). The metallocene catalyst compounds can include "half sandwich" and/or "full sandwich" compounds having one or more Cp ligands (cyclopentadienyl and ligands isolobal to cyclopentadienyl) bound to at least one Group 3 to Group 12 metal atom, and one or more leaving groups bound to the at least one metal atom. As used herein, all reference to the Periodic Table of the Elements and groups thereof is to the NEW NOTATION published in HAWLEY'S CONDENSED CHEMICAL DICTIONARY, Thirteenth Edition, John Wiley & Sons, Inc., (1997) (reproduced there with permission from IUPAC), unless reference is made to the Previous IUPAC form noted with Roman numerals (also appearing in the same), or unless otherwise noted.

The Cp ligands are one or more rings or ring systems, at least a portion of which includes π-bonded systems, such as cycloalkadienyl ligands and heterocyclic analogues. The rings or ring systems typically include atoms selected from the group consisting of Groups 13 to 16 atoms, and, in a particular exemplary embodiment, the atoms that make up the Cp ligands are selected from the group consisting of carbon, nitrogen, oxygen, silicon, sulfur, phosphorous, germanium, boron, aluminum, and combinations thereof, where carbon makes up at least 50% of the ring members. In a more particular exemplary embodiment, the Cp ligands are selected from the group consisting of substituted and unsubstituted cyclopentadienyl ligands and ligands isolobal to cyclopentadienyl, non-limiting examples of which include cyclopentadienyl, indenyl, fluorenyl and other structures. Further non-limiting examples of such ligands include cyclopentadienyl, cyclopentaphenanthreneyl, indenyl, benzindenyl, fluorenyl, octahydrofluorenyl, cyclooctatetraenyl, cyclopentacyclododecene, phenanthrindenyl, 3,4-benzofluorenyl, 9-phenylfluorenyl, 8-H-cyclopent[a]acenaphthylenyl, 7-H-dibenzofluorenyl, indeno[1,2-9]anthrene, thiophenoindenyl, thiophenofluorenyl, hydrogenated versions thereof (e.g., 4,5,6,7-tetrahydroindenyl, or "$H_4$ Ind"), substituted versions thereof (as discussed and described in more detail below), and heterocyclic versions thereof.

The metal atom "M" of the metallocene catalyst compound can be selected from the group consisting of Groups 3 through 12 atoms and lanthanide Group atoms in one exemplary embodiment; and selected from the group consisting of Groups 3 through 10 atoms in a more particular exemplary embodiment, and selected from the group consisting of Sc, Ti, Zr, Hf, V, Nb, Ta, Mn, Re, Fe, Ru, Os, Co, Rh, Ir, and Ni in yet a more particular exemplary embodiment; and selected from the group consisting of Groups 4, 5, and 6 atoms in yet a more particular exemplary embodiment, and Ti, Zr, Hf atoms in yet a more particular exemplary embodiment, and Hf in yet a more particular exemplary embodiment. The oxidation state of the metal atom "M" can range from 0 to +7 in one exemplary embodiment; and in a more particular exemplary embodiment, can be +1, +2, +3, +4, or +5; and in yet a more particular exemplary embodiment can be +2, +3 or +4. The groups bound to the metal atom "M" are such that the compounds described below in the formulas and structures are electrically neutral, unless otherwise indicated. The Cp ligand forms at least one chemical bond with the metal atom M to form the "metallocene catalyst compound." The Cp ligands are distinct from the leaving groups bound to the catalyst compound in that they are not highly susceptible to substitution/abstraction reactions.

The one or more metallocene catalyst compounds can be represented by the formula (I).

$$Cp^A Cp^B MX_n \qquad (I)$$

In formula (I), M is as described above; each X is chemically bonded to M; each Cp group is chemically bonded to M; and n is 0 or an integer from 1 to 4. In some embodiments, n may be 1 or 2. The ligands represented by $Cp^A$ and $Cp^B$ in formula (I) can be the same or different cyclopentadienyl ligands or ligands isolobal to cyclopentadienyl, either or both of which can contain heteroatoms and either or both of which can be substituted by a group R. In at least one specific embodiment, $Cp^A$ and $Cp^B$ are independently selected from the group consisting of cyclopentadienyl, indenyl, tetrahydroindenyl, fluorenyl, and substituted derivatives of each.

Independently, each $Cp^A$ and $Cp^B$ of formula (I) can be unsubstituted or substituted with any one or combination of substituent groups R. Non-limiting examples of substituent groups R as used in structure (I) as well as ring substituents in structures Va-d, discussed and described below, include groups selected from the group consisting of hydrogen radicals, alkyls, alkenyls, alkynyls, cycloalkyls, aryls, acyls, aroyls, alkoxys, aryloxys, alkylthiols, dialkylamines, alkylamidos, alkoxycarbonyls, aryloxycarbonyls, carbomoyls, alkyl- and dialkyl-carbamoyls, acyloxys, acylaminos, aroylaminos, and combinations thereof. More particular non-limiting examples of alkyl substituents R associated with formulas (I) through (Va-d) include methyl, ethyl, propyl, butyl, pentyl, hexyl, cyclopentyl, cyclohexyl, benzyl, phenyl, methylphenyl, and tert-butylphenyl groups and the like, including all their isomers, for example, tertiary-butyl, isopropyl, and the like. Other possible radicals include substituted alkyls and aryls such as, for example, fluoromethyl, fluroethyl, difluroethyl, iodopropyl, bromohexyl, chlorobenzyl, hydrocarbyl substituted organometalloid radicals including trimethylsilyl, trimethylgermyl, methyldiethylsilyl, and the like, and halocarbyl-substituted organometalloid radicals, including tris(trifluoromethyl)silyl, methylbis(difluoromethyl)silyl, bromomethyldimethylgermyl and the like; and disubstituted boron radicals including dimethylboron, for example; and disubstituted Group 15 radicals including dimethylamine, dimethylphosphine, diphenylamine, methylphenylphosphine, as well as Group 16 radicals including methoxy, ethoxy, propoxy, phenoxy, methylsulfide and ethylsulfide. Other substituent groups R include, but are not limited to, olefins such as olefinically unsaturated substituents including vinyl-terminated ligands such as, for example, 3-butenyl, 2-propenyl, 5-hexenyl, and the like. In one exemplary embodiment, at least two R groups (two adjacent R groups in a particular exemplary embodiment) are joined to form a ring structure having from 3 to 30 atoms selected from the group consisting of carbon, nitrogen, oxygen, phosphorous, silicon, germanium, aluminum, boron, and combinations thereof. Also, a substituent group R such as 1-butanyl can form a bonding association to the element M.

Each X in the formula (I) above and for the formula/structures (II) through (Va-d) below is independently selected from the group consisting of: any leaving group, in one exemplary embodiment; halogen ions, hydrides, $C_1$ to $C_{12}$ alkyls, $C_2$ to $C_{12}$ alkenyls, $C_6$ to $C_{12}$ aryls, $C_7$ to $C_{20}$ alkylaryls, $C_1$ to $C_{12}$ alkoxys, $C_6$ to $C_{16}$ aryloxys, $C_7$ to $C_8$ alkylaryloxys, $C_1$ to $C_{12}$ fluoroalkyls, $C_6$ to $C_{12}$ fluoroaryls, and $C_1$ to $C_{12}$ heteroatom-containing hydrocarbons and substituted derivatives thereof, in a more particular exemplary embodiment; hydride, halogen ions, $C_1$ to $C_6$ alkyls, $C_2$ to $C_6$ alkenyls, $C_7$ to $C_{18}$ alkylaryls, $C_1$ to $C_6$ alkoxys, $C_6$ to $C_{14}$ aryloxys, $C_7$ to $C_{16}$ alkylaryloxys, $C_1$ to $C_6$ alkylcarboxyl, $C_1$ to $C_6$ fluorinated alkylcarboxylates, $C_6$ to $C_{12}$ arylcarboxylates, $C_7$ to $C_{18}$ alkylarylcarboxylates, $C_1$ to $C_6$ fluoroalkyls, $C_2$ to $C_6$ fluoroalkenyls, and $C_7$ to $C_{18}$ fluoroalkylaryls in yet a more particular exemplary embodiment; hydride, chloride, fluoride, methyl, phenyl, phenoxy, benzoxy, tosyl, fluoromethyls and fluorophenyls, in yet a more particular exemplary embodiment; $C_1$ to $C_{12}$ alkyls, $C_2$ to $C_{12}$ alkenyls, $C_6$ to $C_{12}$ aryls, $C_7$ to $C_{20}$ alkylaryls, substituted $C_1$ to $C_{12}$ alkyls, substituted $C_6$ to $C_{12}$ aryls, substituted $C_7$ to $C_{20}$ alkylaryls and $C_1$ to $C_{12}$ heteroatom-containing alkyls, $C_1$ to $C_{12}$ heteroatom-containing aryls, and $C_1$ to $C_{12}$ heteroatom-containing alkylaryls, in yet a more particular exemplary embodiment; chloride, fluoride, $C_1$ to $C_6$ alkyls, $C_2$ to $C_6$ alkenyls, $C_7$ to $C_{18}$ alkylaryls, halogenated $C_1$ to $C_6$ alkyls, halogenated $C_2$ to $C_6$ alkenyls, and halogenated $C_7$ to $C_{18}$ alkylaryls, in yet a more particular exemplary embodiment; fluoride, methyl, ethyl, propyl, phenyl, methylphenyl, dimethylphenyl, trimethylphenyl, fluoromethyls (mono-, di- and trifluoromethyls) and fluorophenyls (mono-, di-, tri-, tetra- and pentafluorophenyls), in yet a more particular exemplary embodiment; and fluoride, in yet a more particular exemplary embodiment.

Other non-limiting examples of X groups include amines, phosphines, ethers, carboxylates, dienes, hydrocarbon radicals having from 1 to 20 carbon atoms, fluorinated hydrocarbon radicals (e.g., —$C_6F_5$ (pentafluorophenyl)), fluorinated alkylcarboxylates (e.g., $CF_3C(O)O^-$), hydrides, halogen ions and combinations thereof. Other examples of X ligands include alkyl groups such as cyclobutyl, cyclohexyl, methyl, heptyl, tolyl, trifluoromethyl, tetramethylene, pentamethylene, methylidene, methyoxy, ethyoxy, propoxy, phenoxy, bis(N-methylanilide), dimethylamide, dimethylphosphide radicals and the like. In one exemplary embodiment, two or more X's form a part of a fused ring or ring system. In at least one specific embodiment, X can be a leaving group selected from the group consisting of fluoride ions, chloride ions, bromide ions, $C_1$ to $C_{10}$ alkyls, and $C_2$ to $C_{12}$ alkenyls, carboxylates, acetylacetonates, and alkoxides.

The metallocene catalyst compound includes those of formula (I) where $Cp^A$ and $Cp^B$ are bridged to each other by at least one bridging group, (A), such that the structure is represented by formula (II).

$$Cp^A(A)Cp^B MX_n \qquad (II)$$

The bridged compounds represented by formula (II) are known as "bridged metallocenes." The elements $Cp^A$, $Cp^B$, M, X and n in structure (II) are as defined above for formula (I); where each Cp ligand is chemically bonded to M, and (A) is chemically bonded to each Cp. The bridging group (A) can include divalent hydrocarbon groups containing at least one Group 13 to 16 atom, such as, but not limited to, at least one of a carbon, oxygen, nitrogen, silicon, aluminum, boron, germanium, tin atom, and combinations thereof; where the heteroatom can also be $C_1$ to $C_{12}$ alkyl or aryl substituted to satisfy neutral valency. In at least one specific embodiment, the bridging group (A) can also include substituent groups R as defined above (for formula (I)) including halogen radicals and iron. In at least one specific embodiment, the bridging group (A) can be represented by $C_1$ to $C_6$ alkylenes, substituted $C_1$ to $C_6$ alkylenes, oxygen, sulfur, $R'_2C=$, $R'_2Si=$, $=Si(R')_2Si(R'_2)=$,  $R'_2Ge=$, and $R'P=$, where "=" represents two chemical bonds, R' is independently selected from the group consisting of hydride, hydrocarbyl, substituted hydrocarbyl, halocarbyl, substituted halocarbyl, hydrocarbyl-substituted organometalloid, halocarbyl-substituted organometalloid, disubstituted boron, disubstituted Group 15 atoms, substituted Group 16 atoms, and halogen radical; and where two or more R' can be joined to form a ring or ring system. In at least one specific embodiment, the bridged metallocene catalyst compound of formula (II) includes two or more bridging groups (A). In one or more embodiments, (A) can be a divalent bridging group bound to both $Cp^A$ and $Cp^B$ selected from the group consisting of divalent $C_1$ to $C_{20}$ hydrocarbyls and $C_1$ to $C_{20}$ heteroatom containing hydrocarbonyls, where the heteroatom containing hydrocarbonyls include from one to three heteroatoms.

The bridging group (A) can include methylene, ethylene, ethylidene, propylidene, isopropylidene, diphenylmethylene, 1,2-dimethylethylene, 1,2-diphenylethylene, 1,1,2,2-tetramethylethylene, dimethylsilyl, diethylsilyl, methyl-ethylsilyl, trifluoromethylbutylsilyl, bis(trifluoromethyl)silyl, di(n-butyl)silyl, di(n-propyl)silyl, di(i-propyl)silyl, di(n-hexyl)silyl, dicyclohexylsilyl, diphenylsilyl, cyclohexylphenylsilyl, t-butylcyclohexylsilyl, di(t-butylphenyl)silyl, di(p-tolyl)silyl and the corresponding moieties where the Si atom is replaced by a Ge or a C atom; as well as dimethylsilyl, diethylsilyl, dimethylgermyl and diethylgermyl.

The bridging group (A) can also be cyclic, having, for example, 4 to 10 ring members; in a more particular exemplary embodiment, bridging group (A) can have 5 to 7 ring members. The ring members can be selected from the elements mentioned above, and, in a particular embodiment, can be selected from one or more of B, C, Si, Ge, N, and O. Non-limiting examples of ring structures which can be present as, or as part of, the bridging moiety are cyclobutylidene, cyclopentylidene, cyclohexylidene, cycloheptylidene, cyclooctylidene and the corresponding rings where one or two carbon atoms are replaced by at least one of Si, Ge, N and O. In one or more embodiments, one or two carbon atoms can be replaced by at least one of Si and Ge. The bonding arrangement between the ring and the Cp groups can be cis-, trans-, or a combination thereof.

The cyclic bridging groups (A) can be saturated or unsaturated and/or can carry one or more substituents and/or can be fused to one or more other ring structures. If present, the one or more substituents can be, in at least one specific embodiment, selected from the group consisting of hydrocarbyl (e.g., alkyl, such as methyl) and halogen (e.g., F, Cl). The one or more Cp groups to which the above cyclic bridging moieties can optionally be fused can be saturated or unsaturated, and are selected from the group consisting of those having 4 to 10, more particularly 5, 6, or 7 ring members (selected from the group consisting of C, N, O, and S in a particular exemplary embodiment) such as, for example, cyclopentyl, cyclohexyl and phenyl. Moreover, these ring structures can themselves be fused such as, for example, in the case of a naphthyl group. The ring structures can carry one or more substituents. Illustrative, non-limiting examples of these substituents are hydrocarbyl (particularly alkyl) groups and halogen atoms. The ligands $Cp^A$ and $Cp^B$ of formula (I) and (II) can be different from each other. The ligands $Cp^A$ and $Cp^B$ of formula (I) and (II) can be the same.

The metallocene catalyst compound can include bridged mono-ligand metallocene compounds (e.g., mono cyclopentadienyl catalyst components). Exemplary metallocene catalyst compounds are further described in U.S. Pat. No. 6,943,134.

It is contemplated that the metallocene catalyst components discussed and described above include their structural or optical or enantiomeric isomers (racemic mixture), and, in one exemplary embodiment, can be a pure enantiomer. As used herein, a single, bridged, asymmetrically substituted metallocene catalyst compound having a racemic and/or meso isomer does not, itself, constitute at least two different bridged, metallocene catalyst components.

The amount of the transition metal component of the one or more metallocene catalyst compounds in the catalyst system can range from a low of about 0.2 wt. %, about 3 wt. %, about 0.5 wt. %, or about 0.7 wt. % to a high of about 1 wt. %, about 2 wt. %, about 2.5 wt. %, about 3 wt. %, about 3.5 wt. %, or about 4 wt. %, based on the total weight of the catalyst system.

The "metallocene catalyst compound" can include any combinations of any embodiments discussed and described herein. For example, the metallocene catalyst compound can include, but is not limited to, bis(n-propylcyclopentadienyl) hafnium $(CH_3)_2$, bis(n-propylcyclopentadienyl) hafnium $F_2$, bis(n-propylcyclopentadienyl) hafnium $Cl_2$, bis(n-butyl, methyl cyclopentadienyl) zirconium $Cl_2$, or $[(2,3,4,5,6 Me_5C_6N)CH_2CH_2]_2NHZrBn_2$, where Bn is a benzyl group, or any combinations thereof.

In addition to the metallocene catalyst compounds discussed and described above, other suitable metallocene catalyst compounds can include, but are not limited to, metallocenes discussed and described in U.S. Pat. Nos. 7,741,417; 7,179,876; 7,169,864; 7,157,531; 7,129,302; 6,995,109; 6,958,306; 6,884,748; 6,689,847; and WO Publications WO 97/22635; WO 00/699/22; WO 01/30860; WO 01/30861; WO 02/46246; WO 02/50088; WO 04/026921; and WO 06/019494.

Other metallocene catalyst compounds that may be used are supported constrained geometry catalysts (sCGC) that include (a) an ionic complex, (b) a transition metal compound, (c) an organometallic compound, and (d) a support material. Such sCGC catalysts are described in PCT Publication WO2011/017092. In some embodiments, the sCGC catalyst may include a borate ion. The borate anion is represented by the formula $[BQ_{4-z'}(G_q(T-H)_r)_{z'}]^{d-}$, wherein: B is boron in a valence state of 3; Q is selected from the group consisting of hydride, dihydrocarbylamido, halide, hydrocarbyloxide, hydrocarbyl, and substituted-hydrocarbyl radicals; z' is an integer in a range from 1 to 4; G is a polyvalent hydrocarbon radical having r+1 valencies bonded to M' and r groups (T-H); q is an integer, 0 or 1; the group (T-H) is a radical wherein T includes O, S, NR, or PR, the O, S, N or P atom of which is bonded to hydrogen atom H, wherein R is a hydrocarbyl radical, a trihydrocarbylsilyl radical, a trihydrocarbyl germyl radical or hydrogen; r is an integer from 1 to 3; and d is 1. Alternatively the borate ion may be representative by the formula $[BQ_{4-z'}(G_q(T-M°R^C_{x-1}X^a_y)_r)_{z'}]^{d-}$, wherein: B is boron in a valence state of 3; Q is selected from the group consisting of hydride, dihydrocarbylamido, halide, hydrocarbyloxide, hydrocarbyl, and substituted-hydrocarbyl radicals; z' is an integer in a range from 1 to 4; G is a polyvalent hydrocarbon radical having r+1 valencies bonded to B and r groups (T-M°R^C_{x-1}X^a_y); q is an integer, 0 or 1; the group (T-M°R^C_{x-1}X^a_y) is a radical wherein T includes O, S, NR, or PR, the O, S, N or P atom of which is bonded to M°, wherein R is a hydrocarbyl radical, a trihydrocarbylsilyl radical, a trihydrocarbyl germyl radical or hydrogen; M° is a metal or metalloid selected from Groups 1-14 of the Periodic Table of the Elements, $R^C$ independently each occurrence is hydrogen or a group having from 1 to 80 nonhydrogen atoms which is hydrocarbyl, hydrocarbylsilyl, or hydrocarbylsilylhydrocarbyl; $X^a$ is a noninterfering group having from 1 to 100 nonhydrogen atoms which is halo-substituted hydrocarbyl, hydrocarbylamino-substituted hydrocarbyl, hydrocarbyloxy-substituted hydrocarbyl, hydrocarbylamino, di(hydrocarbyl)amino, hydrocarbyloxy or halide; x is a nonzero integer which may range from 1 to an integer equal to the valence of M°; y is zero or a nonzero integer which may range from 1 to an integer equal to 1 less than the valence of M°; and x+y equals the valence of M°; r is an integer from 1 to 3; and d is 1. In some embodiments, the borate ion may be of the above described formulas where z' is 1 or 2, q is 1, and r is 1.

The catalyst system can include other single site catalysts such as Group 15-containing catalysts. The catalyst system can include one or more second catalysts in addition to the single site catalyst compound such as chromium-based catalysts, Ziegler-Natta catalysts, one or more additional single-site catalysts such as metallocenes or Group 15-containing catalysts, bimetallic catalysts, and mixed catalysts. The catalyst system can also include $AlCl_3$, cobalt, iron, palladium, or any combination thereof.

Illustrative but non-limiting examples of metallocene catalyst compounds that may be used include: bis(cyclopentadienyl) titanium dimethyl; bis(cyclopentadienyl) titanium diphenyl; bis(cyclopentadienyl) zirconium dimethyl; bis(cyclopentadienyl) zirconium diphenyl; bis(cyclopentadienyl) hafnium dimethyl or diphenyl; bis(propylcyclopentadienyl) hafnium dimethyl; bis(cyclopentadienyl) titanium di-neopentyl; bis(cyclopentadienyl) zirconium di-neopentyl; bis(indenyl) zirconium dimethyl (rac and mes); bis(cyclopentadienyl) titanium dibenzyl; bis(cyclopentadienyl) zirconium dibenzyl; bis(cyclopentadienyl) vanadium dimethyl; bis(cyclopentadienyl) titanium methyl chloride; (pentamethylcyclopentadienyl) (1-methylindenyl) zirconium dimethyl; (tetramethylcyclopentadienyl) (1,3-dimethylindenyl) zirconium dimethyl; bis(cyclopentadienyl) titanium ethyl chloride; bis(cyclopentadienyl) titanium phenyl chloride; bis(cyclopentadienyl) zirconium methyl chloride; bis(cyclopentadienyl) zirconium ethyl chloride; bis(cyclopentadienyl) zirconium phenyl chloride; bis(cyclopentadienyl) titanium methyl bromide; cyclopentadienyl titanium trimethyl; cyclopentadienyl zirconium triphenyl; cyclopentadienyl zirconium trineopentyl; cyclopentadienyl zirconium trimethyl; cyclopentadienyl hafnium triphenyl; cyclopentadienyl hafnium trineopentyl; cyclopentadienyl hafnium trimethyl; pentamethylcyclopentadienyl titanium trichloride; pentaethylcyclopentadienyl titanium trichloride; bis(indenyl) titanium diphenyl or dichloride; bis(methylcyclopentadienyl) titanium diphenyl or dihalide; bis(1,2-dimethylcyclopentadienyl) titanium diphenyl or dichloride; bis(1,2-diethylcyclopentadienyl) titanium diphenyl or dichloride; bis(pentamethyl cyclopentadienyl) titanium diphenyl or dichloride; dimethyl silyldicyclopentadienyl titanium diphenyl or dichloride; methyl phosphine dicyclopentadienyl titanium diphenyl or dichloride; methylenedicyclopentadienyl titanium diphenyl or dichloride; isopropyl (cyclopentadienyl) (fluorenyl) zirconium dichloride; isopropyl(cyclopentadienyl) (octahydrofluorenyl) zirconium dichloride; diisopropylmethylene (cyclopentadienyl) (fluorenyl) zirconium dichloride; diisobutylmethylene (cyclopentadienyl) (fluorenyl) zirconium dichloride; ditertbutylmethylene (cyclopentadienyl) (fluorenyl) zirconium dichloride; cyclohexylidene (cyclopentadienyl) (fluorenyl) zirconium dichloride; diisopropylmethylene (2,5-dimetycyclopentadienyl) (fluorenyl) zirconium dichloride; isopropyl (cyclopentadienyl) (fluorenyl) hafnium dichloride; diphenylmethylene (cyclopentadienyl) (fluorenyl) hafnium dichloride; diisopropylmethylene (cyclopentadienyl) (fluorenyl) hafnium dichloride; diisobutylmethylene (cyclopentadienyl) (fluorenyl)hafnium dichloride; ditertbutylmethylene (cyclopentadienyl) (fluorenyl) hafnium dichloride; cyclohexylindene (cyclopentadienyl) (fluorenyl) hafnium dichloride; diisopropylmethylene (2,5-dimethylcyclopentadienyl) (fluorenyl) hafnium dichloride; isopropyl (cyclopentadienyl) (fluorenyl) titanium dichloride; diphenylmethylene (cyclopentadienyl) (fluorenyl) titanium dichloride; diisopropylmethylene (cyclopentadienyl) (fluorenyl) titanium dichloride; diisobutylmethylene (cyclopentadienyl) (fluorenyl) titanium dichloride; ditertbutylmethylene (cyclopentadienyl) (fluorenyl) titanium dichloride; cyclohexylidene (cyclopentadienyl) (fluorenyl)titanium dichloride; diisopropylmethylene (2,5-dimethyl cyclopentadienyl fluorenyl) titanium dichloride; racemic-ethylene bis(1-indenyl) zirconium (W) dichloride; racemic-ethylene bis(4,5,6,7-tetrahydro-1-indenyl) zirconium (IV) dichloride; racemic-dimethylsilyl bis(1-indenyl) zirconium (IV) dichloride; racemic-dimethylsilyl bis(4,5,6,7-tetrahydro-1-indenyl) zirconium (IV) dichloride; racemic-1,1,2,2-tetramethylsilanylene bis(1-indenyl) zirconium (IV) dichloride; racemic-1,1,2,2-tetramethylsilanylene bis(4,5,6,7-tetrahydro-1-indenyl) zirconium (IV) dichloride; ethylidene (1-indenyl tetramethylcyclopentadienyl) zirconium (IV) dichloride; racemic-dimethylsilyl bis(2-methyl-4-t-butyl-1-cyclopentadienyl)zirconium (IV) dichloride; racemic-ethylene bis(1-indenyl)hafnium (IV) dichloride; racemic-ethylene bis(4,5,6,7-tetrahydro-1-indenyl) hafnium (IV) dichloride; racemic-dimethylsilyl bis(1-indenyl) hafnium (IV) dichloride; racemic-dimethylsilyl bis(4,5,6,7-tetrahydro-1-indenyl) hafnium (IV) dichloride; racemic-1,1,2,2-tetramethylsilanylene bis(1-indenyl) hafnium (IV) dichloride; racemic-1,1,2,2-tetramethylsilanylene bis(4,5,6,7-tetrahydro-1-indenyl) hafnium (IV) dichloride; ethylidene (1-indenyl-2,3,4,5-tetramethyl-1-cyclopentadienyl) hafnium (IV) dichloride; racemic-ethylene bis(1-indenyl) titanium (IV) dichloride; racemic-ethylene bis(4,5,6,7-tetrahydro-1-indenyl) titanium (IV) dichloride; racemic-dimethylsilyl bis(1-indenyl) titanium (IV) dichloride; racemic-dimethylsilyl bis(4,5,6,7-tetrahydro-1-indenyl) titanium (IV) dichloride; racemic-1,1,2,2-tetramethylsilanylene bis(1-indenyl) titanium (IV) dichloride racemic-1,1,2,2-tetramethylsilanylene bis(4,5,6,7-tetrahydro-1-indenyl) titanium (IV) dichloride; and ethylidene (1-indenyl-2,3,4,5-tetramethyl-1-cyclopentadienyl) titanium (IV) dichloride.

Other metallocene catalyst compounds that may be used in embodiments are diphenylmethylene (cyclopentadienyl) (fluorenyl) zirconium dichloride; racemic-dimethylsilyl bis (2-methyl-1-indenyl) zirconium (IV) dichloride; racemic-dimethylsilyl bis(2-methyl-4-(1-naphthyl-1-indenyl) zirconium (IV) dichloride; and racemic-dimethylsilyl bis(2-methyl-4-phenyl-1-indenyl) zirconium (IV) dichloride. Further metallocene catalyst compounds include: indenyl zirconium tris(diethylcarbamate); indenyl zirconium tris (pivalate); indenyl zirconium tris(p-toluate); indenyl zirconium tris(benzoate); (1-methylindenyl)zirconium tris(pivalate); (2-methylindenyl)zirconium tris(diethylcarbamate); (methylcyclopentadienyl)zirconium tris(pivalate); cyclopentadienyl tris(pivalate); and (pentamethylcyclopentadienyl)zirconium tris(benzoate).

Examples of structures of metallocene compounds that may be used in embodiments include the hafnium compound shown as formula (II), the zirconium compounds shown as formulas (IV-A-C), and bridged zirconium compounds, shown as formulas (V-A-B).

(III)

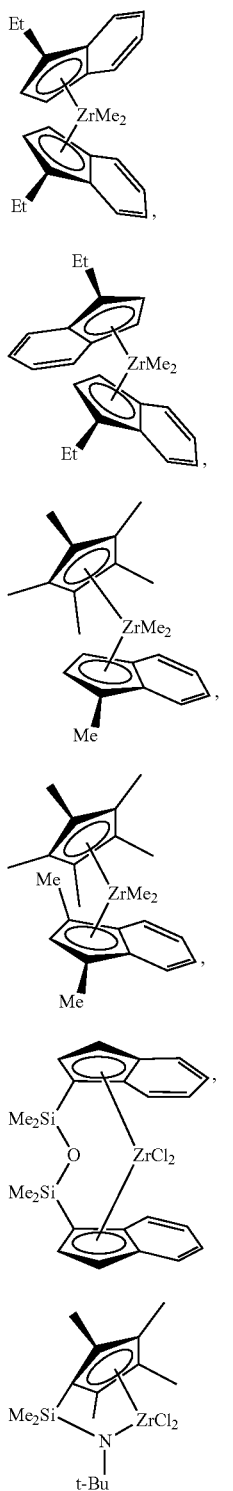

(IV-A)

(IV-B)

(IV-C)

(IV-D)

(V-A)

(V-B)

Although these compounds are shown with methyl- and chloro-groups attached to the central metal, it can be understood that these groups may be different without changing the catalyst involved. For example, each of these substituents may independently be a methyl group (Me), a chloro group (Cl), a fluoro group (F), or any number of other groups, including organic groups, or heteroatom groups.

Further, these substituents will change during the reaction, as a pre-catalyst is converted to the active catalyst for the reaction.

Group 15 Atom and Metal-Containing Catalyst Compounds

The catalyst system can include one or more Group 15 metal-containing catalyst compounds. The Group 15 metal-containing compound generally includes a Group 3 to 14 metal atom, a Group 3 to 7, or a Group 4 to 6 metal atom. In many embodiments, the Group 15 metal-containing compound includes a Group 4 metal atom bound to at least one leaving group and also bound to at least two Group 15 atoms, at least one of which is also bound to a Group 15 or 16 atom through another group.

In one or more embodiments, at least one of the Group 15 atoms is also bound to a Group 15 or 16 atom through another group which may be a $C_1$ to $C_{20}$ hydrocarbon group, a heteroatom containing group, silicon, germanium, tin, lead, or phosphorus, wherein the Group 15 or 16 atom may also be bound to nothing or a hydrogen, a Group 14 atom containing group, a halogen, or a heteroatom containing group, and wherein each of the two Group 15 atoms are also bound to a cyclic group and can optionally be bound to hydrogen, a halogen, a heteroatom or a hydrocarbyl group, or a heteroatom containing group.

The Group 15-containing metal compounds can be described more particularly with formulas (VI) or (VII).

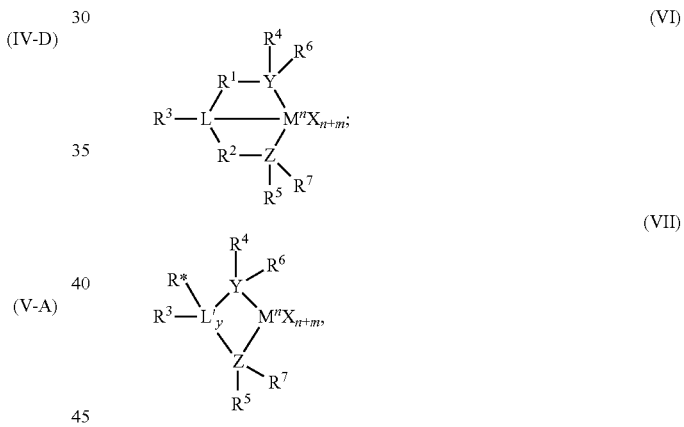

In Formulas (VI) and (VII), M is a Group 3 to 12 transition metal or a Group 13 or 14 main group metal, a Group 4, 5, or 6 metal. In many embodiments, M is a Group 4 metal, such as zirconium, titanium or hafnium. Each X is independently a leaving group, such as an anionic leaving group. The leaving group may include a hydrogen, a hydrocarbyl group, a heteroatom, a halogen, or an alkyl; y is 0 or 1 (when y is 0 group L' is absent). The term 'n' is the oxidation state of M. In various embodiments, n is +3, +4, or +5. In many embodiments, n is +4. The term 'm' represents the formal charge of the YZL or the YZL' ligand, and is 0, −1, −2 or −3 in various embodiments. In many embodiments, m is −2. L is a Group 15 or 16 element, such as nitrogen; L' is a Group 15 or 16 element or Group 14 containing group, such as carbon, silicon or germanium. Y is a Group 15 element, such as nitrogen or phosphorus. In many embodiments, Y is nitrogen. Z is a Group 15 element, such as nitrogen or phosphorus. In many embodiments, Z is nitrogen. $R^1$ and $R^2$ are, independently, a $C_1$ to $C_{20}$ hydrocarbon group, a heteroatom containing group having up to twenty carbon atoms, silicon, germanium, tin, lead, or phosphorus. In many embodiments, $R^1$ and $R^2$ are a $C_2$ to $C_{20}$ alkyl, aryl, or aralkyl group, such as a linear, branched, or cyclic $C_2$ to $C_{20}$ alkyl group, or a $C_2$ to $C_6$ hydrocarbon group. $R^1$ and $R^2$ may also be interconnected to each other. $R^3$ may be absent or may be a hydrocarbon group, a hydrogen, a halogen, a heteroatom containing group. In many embodiments, $R^3$ is absent or a hydrogen, or a linear, cyclic or branched alkyl group having 1 to 20 carbon atoms. $R^4$ and $R^5$ are independently an alkyl group, an aryl group, substituted aryl group, a cyclic alkyl group, a substituted cyclic alkyl group, a cyclic aralkyl group, a substituted cyclic aralkyl group or multiple ring system, often having up to 20 carbon atoms. In many embodiments, $R^4$ and $R^5$ have between 3 and 10 carbon atoms, or are a $C_1$ to $C_{20}$ hydrocarbon group, a $C_1$ to $C_{20}$ aryl group or a $C_1$ to $C_{20}$ aralkyl group, or a heteroatom containing group. $R^4$ and $R^5$ may be interconnected to each other. $R^6$ and $R^7$ are independently absent, hydrogen, an alkyl group, halogen, heteroatom, or a hydrocarbyl group, such as a linear, cyclic, or branched alkyl group having 1 to 20 carbon atoms. In many embodiments, $R^6$ and $R^7$ are absent. $R^*$ may be absent, or may be a hydrogen, a Group 14 atom containing group, a halogen, or a heteroatom containing group.

By "formal charge of the YZL or YZL' ligand," it is meant the charge of the entire ligand absent the metal and the leaving groups X. By "$R^1$ and $R^2$ may also be interconnected" it is meant that $R^1$ and $R^2$ may be directly bound to each other or may be bound to each other through other groups. By "$R^4$ and $R^5$ may also be interconnected" it is meant that $R^4$ and $R^5$ may be directly bound to each other or may be bound to each other through other groups. An alkyl group may be linear, branched alkyl radicals, alkenyl radicals, alkynyl radicals, cycloalkyl radicals, aryl radicals, acyl radicals, aroyl radicals, alkoxy radicals, aryloxy radicals, alkylthio radicals, dialkylamino radicals, alkoxycarbonyl radicals, aryloxycarbonyl radicals, carbomoyl radicals, alkyl- or dialkyl-carbamoyl radicals, acyloxy radicals, acylamino radicals, aroylamino radicals, straight, branched or cyclic, alkylene radicals, or combination thereof. An aralkyl group is defined to be a substituted aryl group.

In one or more embodiments, $R^4$ and $R^5$ are independently a group represented by the following formula (VIII).

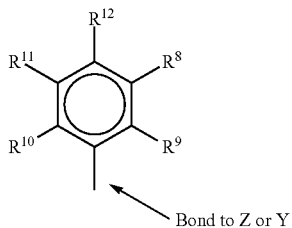

(VIII)

Bond to Z or Y

When $R^4$ and $R^5$ are as formula VII, $R^8$ to $R^{12}$ are each independently hydrogen, a $C_1$ to $C_{40}$ alkyl group, a halide, a heteroatom, a heteroatom containing group containing up to 40 carbon atoms. In many embodiments, $R^8$ to $R^{12}$ are a $C_1$ to $C_{20}$ linear or branched alkyl group, such as a methyl, ethyl, propyl, or butyl group. Any two of the R groups may form a cyclic group and/or a heterocyclic group. The cyclic groups may be aromatic. In one embodiment $R^9$, $R^{10}$ and $R^{12}$ are independently a methyl, ethyl, propyl, or butyl group (including all isomers). In another embodiment, $R^9$, $R^{10}$ and $R^{12}$ are methyl groups, and $R^8$ and $R^{11}$ are hydrogen.

In one or more embodiments, $R^4$ and $R^5$ are both a group represented by the following formula (IX).

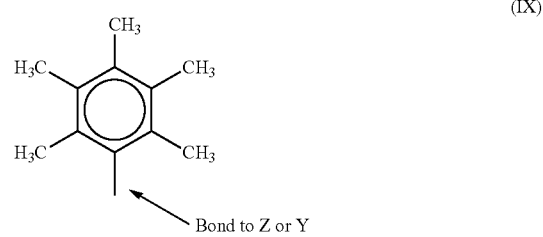

(IX)

Bond to Z or Y

When $R^4$ and $R^5$ follow formula IX, M is a Group 4 metal, such as zirconium, titanium, or hafnium. In many embodiments, M is zirconium. Each of L, Y, and Z may be a nitrogen. Each of $R^1$ and $R^2$ may be —$CH_2$—$CH_2$—. $R^3$ may be hydrogen, and $R^6$ and $R^7$ may be absent.

The Group 15 metal-containing catalyst compound can be represented by the following formula (X).

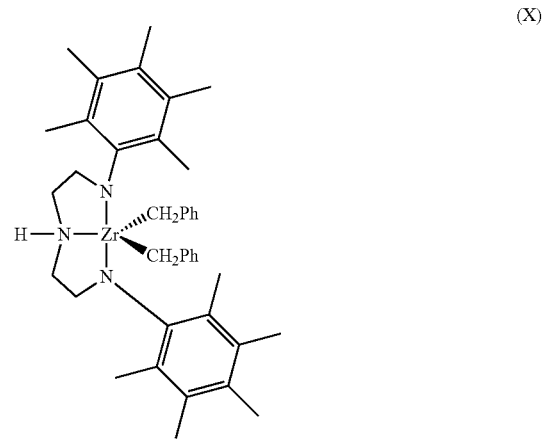

(X)

In formula X, Ph represents phenyl. Representative Group 15-containing metal compounds and preparation thereof can be as discussed and described in U.S. Pat. Nos. 5,318,935; 5,889,128; 6,333,389; 6,271,325; and 6,689,847; WO Publications WO 99/01460; WO 98/46651; WO 2009/064404; WO 2009/064452; and WO 2009/064482; and EP 0 893 454; and EP 0 894 005.

Support

As used herein, the terms support refers to any support material, including a porous support material, such as talc, inorganic oxides, and inorganic chlorides. Catalyst compounds used in the catalyst feed can be supported on the same supports together with the activator, or the activator can be used in an unsupported form, or can be deposited on a support different from the single site catalyst compounds, or any combination thereof. This may be accomplished by any technique commonly used in the art. There are various other methods in the art for supporting a single site catalyst compound. For example, the single site catalyst compound can contain a polymer bound ligand as described in, for example, U.S. Pat. Nos. 5,473,202 and 5,770,755. The single site catalyst compounds can be spray dried as described in, for example, U.S. Pat. No. 5,648,310. The support used with the single site catalyst compound can be functionalized, as described in EP 0 802 203, or at least one substituent or leaving group is selected as described in U.S. Pat. No. 5,688,880.

The support can be or include one or more inorganic oxides, for example, of Group 2, 3, 4, 5, 13, or 14 elements. The inorganic oxide can include, but is not limited to silica, alumina, titania, zirconia, boria, zinc oxide, magnesia, or any combination thereof. Illustrative combinations of inorganic oxides can include, but are not limited to, alumina-silica, silica-titania, alumina-silica-titania, alumina-zirconia, alumina-titania, and the like. The support can be or include alumina, silica, or a combination thereof. In one embodiment described herein, the support is silica.

In addition to a commonly used support, ES 757, suitable commercially available silica supports can include, but are not limited to, ES70, and ES70W, available from PQ Corporation, Davison 955 and Davison 2408, available from the Grace-Davison division of Grace Chemical Co. Suitable commercially available silica-alumina supports can include, but are not limited to, SIRAL® 20, SIRAL® 28M, SIRAL® 30, and SIRAL® 40, available from SASOL®. Generally, catalysts supports comprising silica gels with activators, such as methylaluminoxanes (MAOs), are used in the trim systems described, since these supports may function better for cosupporting solution carried catalysts. In an embodiment described herein, the support is ES70.

Suitable catalyst supports are discussed and described in Hlatky, Chem. Rev. (2000), 100, 1347 1376 and Fink et al., Chem. Rev. (2000), 100, 1377 1390, U.S. Pat. Nos. 4,701,432; 4,808,561; 4,912,075; 4,925,821; 4,937,217; 5,008,228; 5,238,892; 5,240,894; 5,332,706; 5,346,925; 5,422,325; 5,466,649; 5,466,766; 5,468,702; 5,529,965; 5,554,704; 5,629,253; 5,639,835; 5,625,015; 5,643,847; 5,665,665; 5,698,487; 5,714,424; 5,723,400; 5,723,402; 5,731,261; 5,759,940; 5,767,032 and 5,770,664; and WO 95/32995; WO 95/14044; WO 96/06187; and WO 97/02297.

Activator

As used herein, the term "activator" may refer to any compound or combination of compounds, supported, or unsupported, which can activate a single site catalyst compound or component, such as by creating a cationic species of the catalyst component. For example, this can include the abstraction of at least one leaving group (the "X" group in the single site catalyst compounds described herein) from the metal center of the single site catalyst compound/component. The activator may also be referred to as a "co-catalyst."

For example, the activator can include a Lewis acid or a non-coordinating ionic activator or ionizing activator, or any other compound including Lewis bases, aluminum alkyls, and/or conventional-type co-catalysts. In addition to methylaluminoxane ("MAO") and modified methylaluminoxane ("MMAO"), illustrative activators can include, but are not limited to, aluminoxane or modified aluminoxane, and/or ionizing compounds, neutral or ionic, such as tri(n-butyl) ammonium tetrakis(pentafluorophenyl)boron, a trisperfluorophenyl boron metalloid precursor, a trisperfluoronaphthyl boron metalloid precursor, or any combinations thereof.

Aluminoxanes can be described as oligomeric aluminum compounds having —Al(R)—O— subunits, where R is an alkyl group. Examples of aluminoxanes include, but are not limited to, methylaluminoxane ("MAO"), modified methylaluminoxane ("MMAO"), ethylaluminoxane, isobutylaluminoxane, or a combination thereof. Aluminoxanes can be produced by the hydrolysis of the respective trialkylaluminum compound. MMAO can be produced by the hydrolysis of trimethylaluminum and a higher trialkylaluminum, such as triisobutylaluminum. MMAOs are generally more soluble in aliphatic solvents and more stable during storage. There are a variety of methods for preparing aluminoxane and modified aluminoxanes, non-limiting examples can be as discussed and described in U.S. Pat. Nos. 4,665,208; 4,952,540; 5,091,352; 5,206,199; 5,204,419; 4,874,734; 4,924,018; 4,908,463; 4,968,827; 5,308,815; 5,329,032; 5,248,801; 5,235,081; 5,157,137; 5,103,031; 5,391,793; 5,391,529; 5,693,838; 5,731,253; 5,731,451; 5,744,656; 5,847,177; 5,854,166; 5,856,256; and 5,939,346; and EP 0 561 476; EP 0 279 586; EP 0 594-218; and EP 0 586 665; and WO Publications WO 94/10180 and WO 99/15534.

In one or more embodiments, a visually clear MAO can be used. For example, a cloudy or gelled aluminoxane can be filtered to produce a clear aluminoxane or clear aluminoxane can be decanted from a cloudy aluminoxane solution. In another embodiment, a cloudy and/or gelled aluminoxane can be used. Another aluminoxane can include a modified methyl aluminoxane ("MMAO") type 3A (commercially available from Akzo Chemicals, Inc. under the trade name Modified Methylaluminoxane type 3A, discussed and described in U.S. Pat. No. 5,041,584). A suitable source of MAO can be a solution having from about 1 wt. % to about a 50 wt. % MAO, for example. Commercially available MAO solutions can include the 10 wt. % and 30 wt. % MAO solutions available from Albemarle Corporation, of Baton Rouge, La.

As noted above, one or more organo-aluminum compounds such as one or more alkylaluminum compounds can be used in conjunction with the aluminoxanes. For example, alkylaluminum species that may be used are diethylaluminum ethoxide, diethylaluminum chloride, and/or diisobutylaluminum hydride. Examples of trialkylaluminum compounds include, but are not limited to, trimethylaluminum, triethylaluminum ("TEAL"), triisobutylaluminum ("TiBAl"), tri-n-hexylaluminum, tri-n-octylaluminum, tripropylaluminum, tributylaluminum, and the like.

Continuity Additive/Static Control Agent

In gas-phase polyethylene production processes, as disclosed herein, it may be desirable to additionally use one or more static control agents to aid in regulating static levels in the reactor. As used herein, a static control agent is a chemical composition which, when introduced into a fluidized bed reactor, may influence or drive the static charge (negatively, positively, or to zero) in the fluidized bed. The specific static control agent used may depend upon the nature of the static charge, and the choice of static control agent may vary dependent upon the polymer being produced and the single site catalyst compounds being used. For example, the use of static control agents is disclosed in European Patent No. 0229368 and U.S. Pat. Nos. 4,803,251; 4,555,370; and 5,283,278, and references cited therein.

Control agents such as aluminum stearate may be employed. The static control agent used may be selected for its ability to receive the static charge in the fluidized bed without adversely affecting productivity. Other suitable static control agents may also include aluminum distearate, ethoxlated amines, and anti-static compositions such as those provided by Innospec Inc. under the trade name OCTASTAT. For example, OCTASTAT 2000 is a mixture of a polysulfone copolymer, a polymeric polyamine, and oil-soluble sulfonic acid.

Any of the aforementioned control agents, as well as those described in, for example, WO 01/44322, listed under the heading Carboxylate Metal Salt and including those chemicals and compositions listed as antistatic agents may be employed either alone or in combination as a control agent.

For example, the carboxylate metal salt may be combined with an amine containing control agent (e.g., a carboxylate metal salt with any family member belonging to the KEMAMINE® (available from Crompton Corporation) or ATMER® (available from ICI Americas Inc.) family of products).

Other useful continuity additives include ethyleneimine additives useful in embodiments disclosed herein may include polyethyleneimines having the following general formula:

in which n may be from about 10 to about 10,000. The polyethyleneimines may be linear, branched, or hyperbranched (e.g., forming dendritic or arborescent polymer structures). They can be a homopolymer or copolymer of ethyleneimine or mixtures thereof (referred to as polyethyleneimines hereafter). Although linear polymers represented by the chemical formula —[$CH_2$—$CH_2$—NH]— may be used as the polyethyleneimine, materials having primary, secondary, and tertiary branches can also be used.

Commercial polyethyleneimine can be a compound having branches of the ethyleneimine polymer. Suitable polyethyleneimines are commercially available from BASF Corporation under the trade name Lupasol. These compounds can be prepared as a wide range of molecular weights and product activities. Examples of commercial polyethyleneimines sold by BASF suitable for use in the present invention include, but are not limited to, Lupasol FG and Lupasol WF. Another useful continuity additive can include a mixture of aluminum distearate and an ethoxylated amine-type compound, e.g., IRGASTAT AS-990, available from Huntsman (formerly Ciba Specialty Chemicals). The mixture of aluminum distearate and ethoxylated amine type compound can be slurried in mineral oil e.g., Hydrobrite 380. For example, the mixture of aluminum distearate and an ethoxylated amine type compound can be slurried in mineral oil to have total slurry concentration of ranging from about 5 wt. % to about 50 wt. % or about 10 wt. % to about 40 wt. %, or about 15 wt. % to about 30 wt. %. Other useful static control agents and additives are disclosed in U.S. Patent Application Publication No. 2008/0045663.

The continuity additives or static control agents may be added to the reactor in an amount ranging from 0.05 to 200 ppm, based on ethylene feed rate or polymer production rate. In some embodiments, the continuity additive may be added in an amount ranging from 2 to 100 ppm, or in an amount ranging from 4 to 50 ppm.

Polymerization Process

The catalyst system described herein can be used to polymerize one or more olefins to provide one or more polymer products therefrom. Any suitable polymerization process can be used, including, but not limited to, gas phase, slurry, high pressure, and/or solution polymerization processes. In various embodiments, polyolefin polymers are produced in a gas-phase polymerization process utilizing a fluidized bed reactor.

A fluidized bed reactor can include a reaction zone and a velocity reduction zone. The reaction zone can include a bed that includes growing polymer particles, formed polymer particles and a minor amount of catalyst particles fluidized by the continuous flow of the gaseous monomer and diluent to remove heat of polymerization through the reaction zone. Catalyst can be fed to the reaction zone using a dry catalyst feeder or a slurry catalyst feeder.

Optionally, some of the re-circulated gases can be cooled and compressed to form liquids that increase the heat removal capacity of the circulating gas stream when readmitted to the reaction zone. A suitable rate of gas flow can be readily determined by experimentation. Make-up of gaseous monomer to the circulating gas stream can be at a rate equal to the rate at which particulate polymer product and monomer associated therewith is withdrawn from the reactor and the composition of the gas passing through the reactor can be adjusted to maintain an essentially steady state gaseous composition within the reaction zone. The gas leaving the reaction zone can be passed to the velocity reduction zone where entrained particles are removed, for example, by slowing and falling back to the reaction zone. If desired, finer entrained particles and dust can be removed in a separation system, such as a cyclone and/or fines filter. The gas can be passed through a heat exchanger where at least a portion of the heat of polymerization can be removed. The gas can then be compressed in a compressor and returned to the reaction zone. Additional reactor details and means for operating the reactor are described in, for example, U.S. Pat. Nos. 3,709,853; 4,003,712; 4,011,382; 4,302,566; 4,543,399; 4,882,400; 5,352,749; and 5,541,270; EP 0802202; and Belgian Patent No. 839,380.

The terms "polyethylene" and "polyethylene copolymer" refer to a polymer having at least 50 wt. % ethylene-derived units. In various embodiments, the polyethylene can have at least 70 wt. % ethylene-derived units, at least 80 wt. % ethylene-derived units, at least 90 wt. % ethylene-derived units, at least 95 wt. % ethylene-derived units, or at least 100 wt. % ethylene-derived units. The polyethylene can, thus, be a homopolymer or a copolymer, including a terpolymer, having one or more other monomeric units. As described herein, a polyethylene can include, for example, at least one or more other olefins or comonomers. Suitable comonomers can contain 3 to 16 carbon atoms, from 3 to 12 carbon atoms, from 4 to 10 carbon atoms, and from 4 to 8 carbon atoms. Examples of comonomers include, but are not limited to, propylene, 1-butene, 1-pentene, 1-hexene, 1-heptene, 1-octene, 4-methylpent-1-ene, 1-decene, 1-dodecene, 1-hexadecene, and the like.

The reactor temperature of the fluid bed process can be greater than about 30° C., about 40° C., about 50° C., about 90° C., about 100° C., or about 110° C. In general, to maintain reactor capacity, the reactor temperature is operated at the highest feasible temperature taking into account the sintering temperature of the polymer product within the reactor. Thus, the upper temperature limit in one embodiment is the melting temperature of the polyethylene copolymer produced in the reactor. However, higher temperatures may result in both narrower MWDs and narrower composition distributions, as reflected by a lower melt flow ratio (MFR). Although this can be improved by lowering the reaction temperature, this will lower the total production from the reactor. Further information detailing control of the composition distribution for an exemplary catalyst system can be found in U.S. Pat. No. 8,084,560.

The gas phase reactor can be capable of producing from about 10 kg of polymer per hour (25 lbs/hr) to about 90,900 kg/hr (200,000 lbs/hr), or greater, and greater than about 455 kg/hr (1,000 lbs/hr), greater than about 4,540 kg/hr (10,000 lbs/hr), greater than about 11,300 kg/hr (25,000 lbs/hr), greater than about 15,900 kg/hr (35,000 lbs/hr), and greater than about 22,700 kg/hr (50,000 lbs/hr), and from about 29,000 kg/hr (65,000 lbs/hr) to about 45,500 kg/hr (100,000 lbs/hr).

As noted, a slurry polymerization process can also be used in embodiments. A slurry polymerization process generally uses pressures in the range of from about 101 kPa (1 atmosphere) to about 5,070 kPa (50 atmospheres) or greater, and temperatures in the range of from about 0° C. to about 120° C., and more particularly from about 30° C. to about 100° C. In a slurry polymerization, a suspension of solid, particulate polymer can be formed in a liquid polymerization diluent medium to which ethylene, comonomers, and hydrogen along with catalyst can be added. The suspension including diluent can be intermittently or continuously removed from the reactor where the volatile components are separated from the polymer and recycled, optionally after a distillation, to the reactor. The liquid diluent employed in the polymerization medium can be an alkane having from 3 to 7 carbon atoms, such as, for example, a branched alkane. The medium employed should be liquid under the conditions of polymerization and relatively inert. When a propane medium is used the process should be operated above the reaction diluent critical temperature and pressure. In one embodiment, a hexane, isopentane, or isobutane medium can be employed. The slurry can be circulated in a continuous loop system.

Hydrogen gas can be used in olefin polymerization to control the final properties of the polyolefin, such as described in the "Polypropylene Handbook," at pages 76-78 (Hanser Publishers, 1996). Using certain catalyst systems, increasing concentrations (partial pressures) of hydrogen can increase the flow index (FI) of the polyethylene copolymer generated. The flow index can thus be influenced by the hydrogen concentration. The amount of hydrogen in the polymerization can be expressed as a mole ratio relative to the total polymerizable monomer, for example, ethylene, or a blend of ethylene and hexene or propylene.

The amount of hydrogen used in the polymerization process can be adjusted to achieve the desired melt index of the final polyolefin resin. For example, the mole ratio of hydrogen to total monomer ($H_2$:monomer) can be greater than about 0.0001, greater than about 0.0005, or greater than about 0.001. Further, the mole ratio of hydrogen to total monomer ($H_2$:monomer) can be less than about 10, less than about 5, less than about 3, and less than about 0.10. A desirable range for the mole ratio of hydrogen to monomer can include any combination of any upper mole ratio limit with any lower mole ratio limit described herein. Expressed another way, the amount of hydrogen in the reactor at any time can range to up to about 5,000 ppm, up to about 4,000 ppm in another embodiment, up to about 3,000 ppm, or between about 50 ppm and 5,000 ppm, or between about 50 ppm and 2,000 ppm in another embodiment. The amount of hydrogen in the reactor can range from a low of about 1 ppm, about 50 ppmw, or about 100 ppm to a high of about 400 ppm, about 800 ppm, about 1,000 ppm, about 1,500 ppm, or about 2,000 ppm. Further, the ratio of hydrogen to total monomer ($H_2$:monomer) can be about 0.00001:1 to about 2:1, about 0.005:1 to about 1.5:1, or about 0.0001:1 to about 1:1. The one or more reactor pressures in a gas phase process (either single stage or two or more stages) can vary from 690 kPa (100 psig) to 3,448 kPa (500 psig), in the range from 1,379 kPa (200 psig) to 2,759 kPa (400 psig), or in the range from 1,724 kPa (250 psig) to 2,414 kPa (350 psig).

The melt flow ratio (MFR), melt index, density, relative amount of polymer produced by the catalyst, and other properties of the polymer produced may be changed by manipulating process parameters. Any number of process parameters may be adjusted, including manipulating hydrogen or comonomer concentrations in the polymerization system. The concentrations of reactants in the reactor can be adjusted the feed rate of these reactants to the reactor, by changing the amount of liquid or gas that is withdrawn or purged from the process, changing the amount and/or composition of a recovered liquid and/or recovered gas returned to the polymerization process, wherein the recovered liquid or recovered gas can be recovered from polymer discharged from the polymerization process. Further, process parameters that can be adjusted include changing the polymerization temperature, changing the ethylene partial pressure in the polymerization process, changing the ethylene to comonomer ratio in the polymerization process, changing the activator to transition metal ratio in the activation sequence.

In one embodiment, a polymer product property is measured off-line and/or in-line and in response the ratio of the hydrogen or comonomer to the monomer is altered. The product property measured can include the polymer product's flow index, melt index, density, MWD, comonomer content, composition distribution, and combinations thereof. In another embodiment, when the ratio of the hydrogen or comonomer to the monomer is altered, the introduction rate of the catalyst composition to the reactor, or other process parameters, is altered to maintain a desired production rate.

The product polyethylene can have a melt flow ratio (MFR or $I_{21}/I_2$) ranging from about 5 to about 300, or from about 10 to less than about 150, or, in many embodiments, from about 15 to about 50. Flow index (FI, HLMI, or $I_{21}$ can be measured in accordance with ASTM D1238 (190° C., 21.6 kg). The melt index (MI, $I_2$) can be measured in accordance with ASTM D1238 (at 190° C., 2.16 kg weight).

Density can be determined in accordance with ASTM D-792. Density is expressed as grams per cubic centimeter (g/cm$^3$) unless otherwise noted. The polyethylene can have a density ranging from a low of about 0.89 g/cm$^3$, about 0.90 g/cm$^3$, or about 0.91 g/cm$^3$ to a high of about 0.95 g/cm$^3$, about 0.96 g/cm$^3$, or about 0.97 g/cm$^3$.

The settled bulk density (SBD) is the weight of material per unit volume, usually expressed in pounds per cubic foot. The SBD is calculated by pouring an adequate amount of resin to overflow a 400 cubic centimeter cylinder. The excess of resin at the top of the cylinder is immediately removed by taking a straight edge and sliding across the top of the cylinder. The full cylinder is weighed and the resin weight is calculated in grams. The weight of the resin is divided by the volume of the cylinder and the SBD result is converted to pounds of resin per cubic foot.

The fluidized bulk density (FBD) is defined as the weight of solids per unit volume of a fluidized bed at a given superficial gas velocity. FBD value is normally obtained by determining the total weight of resin divided by the volume of the bed occupied by the resin at the given superficial gas velocity. This can be performed using the formula in Eqn. 1:

$$FBD=(\Delta P*S)/(S1*H) \qquad \text{Eqn. 1}$$

In Eqn. 1, $\Delta P$ represents the pressure drop between bottom and middle tap (lbs/in$^2$), S represents the cross sectional area of reactor (in$^2$), S1 represents the cross sectional area of reactor in (ft$^2$), and H represents the distance between the bottom and middle tap (ft), The FBD value calculated by this equation is corrected to an actual value based on reactor pressure, temperature and gas density.

The polyethylene can have a settled bulk density (SBD) of about 0.25 g/cm$^3$ to about 0.5 g/cm$^3$. For example, the settled bulk density of the polyethylene can range from a low of about 0.30 g/cm$^3$, about 0.32 g/cm$^3$, or about 0.33 g/cm$^3$ to a high of about 0.40 g/cm$^3$, about 0.44 g/cm$^3$, or about 0.48 g/cm$^3$. The polyethylene can have a fluidized bulk density (FBD) of about 0.25 g/cm$^3$ to about 0.5 g/cm$^3$. For example, the fluidized bulk density can range from a low of about 0.25 g/cm³, about 0.27 g/cm³, or about 0.29 g/cm³ to a high of about 0.34 g/cm³, about 0.36 g/cm³, or about 0.38 g/cm³.

The polyethylene can have an average ratio of fluidized bulk density to settled bulk density (FBD/SBD) of at least about 0.570, at least about 0.571, at least about 0.572, at least about 0.573, or at least about 0.574. For example, the FBD/SBD can range from a low of about 0.570, 0.571, 0.572, 0.573, or 0.574 to a high of about 0.577, 0.578, 0.579, 0.580, 0.581, or 0.582.

The polyethylene can be suitable for such articles as films, fibers, nonwoven and/or woven fabrics, extruded articles, and/or molded articles. Examples of films include blown or cast films formed by coextrusion or by lamination useful as shrink film, cling film, stretch film, sealing films, oriented films, snack packaging, heavy duty bags, grocery sacks, baked and frozen food packaging, medical packaging, industrial liners, membranes, etc. in food-contact and non-food contact applications, agricultural films and sheets. Examples of fibers include melt spinning, solution spinning and melt blown fiber operations for use in woven or non-woven form to make filters, diaper fabrics, hygiene products, medical garments, geotextiles, etc. Examples of extruded articles include tubing, medical tubing, wire and cable coatings, pipe, geomembranes, and pond liners. Examples of molded articles include single and multi-layered constructions in the form of bottles, tanks, large hollow articles, rigid food containers and toys, and the like.

EXAMPLES

To provide a better understanding of the foregoing discussion, the following non-limiting examples are provided. All resins, proportions, and percentages are by weight unless otherwise indicated.

A pilot plant campaign was conducted to evaluate alternate silica supports for catalysts. The campaign used a hafnium based catalyst, bis(propylcyclopentadienyl) hafnium dimethyl (HfP), and was run to determine if a support yielding a larger polymer particle size is feasible. The HfP is co-supported with an activator, MAO, on silica particles. In some embodiment described herein, larger particle sizes are used to increase the ratio of fluidized bulk density to settled bulk density for a broader operating window, ensuring better fluidization quality in the fluid bed reactor, and reducing rubble formation.

Currently, a commercial silica grade, ES757, is being used as the commercial HfP catalyst silica support. ES757 is available from the PQ Corporation of Malvern, Pa. Polymer made with catalyst on the ES757 silica has an average particle size (APS) of about 0.023 inches (about 584.2 µm). However, prior work indicated that larger catalyst supports cause lower catalyst productivity.

The study evaluated catalysts supported on each of four different silica supports including the standard ES757 silica. All supports are commercially available. The different silica supports tested were ES70, available from the PQ Corporation, and Davison 955 and Davison 2408, available from W.R. Grace & Co. Each of these different silica supports was dehydrated on a pilot scale and the catalysts were prepared on a pilot scale. Three variations of catalyst on the standard ES757 were included in the study. Catalyst Reference #2652M was commercially prepared catalyst on commercially dehydrated ES757 silica. Catalysts A and B were pilot-scale prepared catalysts on commercially dehydrated ES757 silica. Catalyst H was pilot-scale prepared catalyst on pilot-scale dehydrated ES757 silica. Two different resin grades were produced for evaluation using each supported catalyst. A first grade, 1270, had a 0.912 density and a 0.7 MI and a second grade, 1810, had a 0.918 density and a 1.0 MI. The campaign results indicated that the catalyst supported on ES70 silica gave the best results, by increasing the polymer APS by about 39% to about 0.032 inches with no effect on catalyst productivity. Furthermore, the polymer supported on ES70 silica gave the highest ratio of fluidized bulk density to settled bulk density.

Experimental Procedures

Procedure for Forming HfP Using ES70 Silica for Pilot Plant Runs in the Mix Tank The materials used to form a HfP catalyst on an ES70 silica included about bis(n-propyl-cyclopentadienyl)hafnium dimethyl (HfP), ES70 silica dehydrated at 875° C., and a 10% solution of methylaluminoxane (MAO) in toluene. The Al:Hf molar ratio was from about 80:1 to 130:1. Methods of preparing such catalyst compositions are disclosed in, for example, U.S. Pat. No. 6,242,545. The mix tank used for the supporting procedure was cleaned, dried, and pressure tested before operation. The mix tank is stirred with a double helical ribbon impeller.

The MAO was charged to the clean mix tank at about room temperature, e.g., about 27° C. to 30° C. The reactor was stirred at a low speed. The HfP was dissolved in 100 ml of toluene and transferred to the mix tank. The bottle was rinsed with 50 to 100 ml of dry toluene and the rinse was transferred to the mix tank. The stirring speed was increased to 130 rpm and the mix tank was stirred for 30 minutes at room temperature, about 27° C.-30° C. Then the silica was charged to the mix tank. The resulting slurry was mixed for another hour at room temperature. Then a drying procedure was started. The drying was performed by increasing the bath temperature to 75° C. and reducing the pressure gradually until it reached full vacuum. At the point when no free liquid was present, the stirring speed was reduced to prevent the slurry from climbing the impeller blade. Once the material was through the mud point, the stirring speed was increased to 130 rpm.

When solid carryover began to occur, the vacuum was reduced to about 27 inches Hg (0.1 atm) for at least 60 minutes to decrease spattering and carryover. When the material temperature increased to 62° C., the vacuum was increased to full in slow steps to minimize strong eruptions. Once there were no more eruptions, a nitrogen sweep was started to continue the drying. The material was dried until the material temperature had leveled off for 2 hours, giving a residual toluene concentration of less than 3%. The catalyst was cooled down and discharged into a clean container and a final catalyst sample was taken. Expected yield for this batch is 1045 g with the actual yields for each catalyst provided in table 2.

The catalyst sample was submitted for the following analyses: ICP analysis to determine Al, Hf, Si content; GC analysis for toluene residue; Malvern for particle size; and catalyst productivity. The other catalysts listed in Tables 1 and 2 were generated using very similar procedures, merely substituting the different silica supports. The test results for the catalyst samples are listed in Table 2.

The polymerization reactions described in the following examples were conducted in a continuous pilot-scale gas phase fluidized bed reactor of 0.35 meters internal diameter and 2.3 meters in bed height. The fluidized bed was made up of polymer granules. The gaseous feed streams of ethylene and hydrogen together with liquid comonomer were introduced below the reactor bed into the recycle gas line. Hexene was used as comonomer. The individual flow rates of ethylene, hydrogen and comonomer were controlled to maintain fixed composition targets. The ethylene concentration was controlled to maintain a constant ethylene partial pressure. The hydrogen was controlled to maintain a constant hydrogen to ethylene mole ratio. The concentrations of all the gases were measured by an on-line gas chromatograph to ensure relatively constant composition in the recycle gas stream.

The dry catalyst was injected directly into the fluidized bed using purified nitrogen as a carrier. Its rate was adjusted to maintain a constant production rate. The control catalyst used in these examples was HfP based catalyst produced on a commercial scale by Univation Technologies under the trade name XCAT™ VP-100. The reacting bed of growing polymer particles was maintained in a fluidized state by the continuous flow of the make-up feed and recycle gas through the reaction zone. A superficial gas velocity of 0.6-0.9 meters/sec was used to achieve this. The reactor was operated at a total pressure of 2240 kPa. The reactor was operated at a constant reaction temperature depending on the desired product.

The continuity additive, UT-CA-300, was charged to an agitated slurry feeding vessel. UT-CA-300 is a mixture of aluminum distearate and an ethoxylated amine type compound. The additive slurry was metered to the reactor at a rate to maintain the desired concentration in the bed based on polymer production rate. An inert hydrocarbon such as isopentane was used as a carrier medium.

The fluidized bed was maintained at a constant height by withdrawing a portion of the bed at a rate equal to the rate of formation of particulate product. The rate of product formation (the polymer production rate) was in the range of 15-25 kg/hour. The product was removed semi-continuously via a series of valves into a fixed volume chamber. This product was purged to remove entrained hydrocarbons and treated with a small steam of humidified nitrogen to deactivate any trace quantities of residual catalyst.

Resin Runs Completed

Table 1 has a list of the 15 resin samples prepared during the run. Not including the control catalyst, there were three catalyst batches made for ES757, two batches for Davison 955, two batches for PQ ES70, and one batch of Davison 2408. All these catalyst batches have the same catalyst formulation (HfP based) but differ only in the type of support used. Evaluation of these catalyst batches was carried out at 200 psia ethylene partial pressure, approximately 2 hour residence time, 2-3 mole percent isopentane level and a continuity additive level of 30 ppmw based on ethylene feed rate.

TABLE 1

Target resins made with HfP catalyst made with different supports.

| Part | Catalyst Support | Cat. Ref # | MI | Density | MFR |
|---|---|---|---|---|---|
| 1E | Full Commercial Control (ES757) | 2652M | 1 | 0.918 | 28 |
| 2A | Commercially Dehydrated ES757 | A | 0.7 | 0.912 | 26 |
| 3 | Commercially Dehydrated ES757 | B | 1 | 0.918 | 28 |
| 3A | | | 0.7 | 0.912 | 26 |
| 4 | Pilot Plant Dehydrated 955 | C | 1 | 0.918 | 28 |
| 5 | Pilot Plant Dehydrated 955 | D | 1 | 0.918 | 28 |
| 5A | | | 0.7 | 0.912 | 26 |
| 6 | Pilot Plant Dehydrated ES70 | E | 1 | 0.918 | 28 |
| 6A | | | 0.7 | 0.912 | 26 |
| 7 | Pilot Plant Dehydrated ES70 | F | 1 | 0.918 | 28 |
| 7A | | | 0.7 | 0.912 | 26 |
| 8 | Pilot Plant Dehydrated 2408 | G | 1 | 0.918 | 28 |
| 8A | | | 0.7 | 0.912 | 26 |

TABLE 1-continued

Target resins made with HfP catalyst made with different supports.

| Part | Catalyst Support | Cat. Ref # | MI | Density | MFR |
|---|---|---|---|---|---|
| 9 | Pilot Plant Dehydrated ES757 | H | 1 | 0.918 | 28 |
| 9A | | | 0.7 | 0.912 | 26 |

The properties of the pilot plant produced catalysts used during this campaign and the support particle size distribution are shown in Table 2. As used in Table 2, the Malvern is a particle measurement instrument that determines particle size by an optical laser light scattering technique. The numbers in each of the columns under the Malvern results show the percentage of particles with a size less than the number shown, i.e., the D10 column indicates that 10% of the particles have a size less than or equal to that value, while the D90 column indicates that 90% of the particles have a size less than or equal to that value. The values in the Span column show the calculated ratio ((D90)−(D10))/D50, which provides an indication of the breadth of the distribution Tables 3A and 3B show the pilot plant conditions and results for each of these resins. Two product grades, 1810 and 1270, were made for each batch of catalyst for product evaluation. The two product grades differ in polymer properties. The target properties for the 1810 grade were 1 MI, 0.918 Density, and a 28 MFR. The target properties for the 1270 grade were 0.7 MI, 0.912 Density, and a 26 MFR. The resin properties for each grade were achieved by adjusting H2/C2 ratio, C6/C2 ratio, and the reactor temperature. The results for the 1810 grades are shown in Table 3A, while the results for the 1270 grade are shown in Table 3B.

TABLE 2

Pilot Plant-Produced Catalyst Properties

| Cat Ref # | Catalyst Description | Actual Yield (g) | Malvern for final catalyst | | | |
|---|---|---|---|---|---|---|
| | | | D10 (μm) | D50 (μm) | D90 (μm) | Span |
| A | HfP catalyst with ES757 dehydrated commercially at 875° C. | 867 | 13.5 | 27.8 | 49.1 | 1.3 |
| B | HfP catalyst with ES757 dehydrated commercially at 875° C. | 943 | 12.8 | 27.0 | 48.3 | 1.3 |
| C | HfP catalyst with 955 dehydrated in pilot plant at 875° C. | 930 | 19.9 | 48.2 | 90.3 | 1.5 |
| D | HfP catalyst with 955 dehydrated in pilot plant at 875° C. | 1053 | 21.1 | 48.0 | 88.9 | 1.4 |
| E | HfP with ES70 dehydrated in pilot plant at 875° C. | 996 | 20.0 | 42.0 | 75.4 | 1.3 |
| F | HfP with ES70 dehydrated in pilot plant at 875° C. | 920 | 20.0 | 41.4 | 74.0 | 1.3 |
| G | HfP with 2408 dehydrated in pilot plant at 875° C. | 1188 | 21.0 | 41.0 | 73.7 | 1.3 |
| H | HfP with ES757 dehydrated in pilot plant at 875° C. | 896 | 15.4 | 27.2 | 45.7 | 1.1 |

The comparative results for the resins that were made are graphically illustrated in FIGS. 1-12, which show results for Productivity, MFR response, Average Particle Size, Particle Size Distribution, Hexene response, and Hydrogen Response for each of the catalysts prepared.

FIG. 1 is a bar chart illustrating productivities of catalysts on different spherical silica supports as determined by inductively couple plasma (ICP) emission spectroscopy analysis of the metal concentration. The y-axis 102 represents the catalyst productivity in grams of polymer produced per gram of catalyst. The various catalysts supported on the PQ ES757 silica are indicated by reference number 104. The productivities for the ES757 supported catalyst show good repeatability between the batches tested. The average productivity for the lab-prepared ES757 batches was approximately 7500 kg/kg.

The productivities for catalysts supported on the Davison 2408 silica are indicated by reference number 106. The productivities between the two batches were consistent with an average productivity of 5800 kg/kg. The Davison 2408 supported catalyst had approximately 22% less productivity than the standard.

The productivities for catalysts supported on the Davison 955 silica are indicated by reference number 108. The variation in productivity between the batches was 30%, but was not a concern, when the best productivity for a catalyst supported on the 955 produced was 5400 kg/kg, which was still 30% less than the standard.

The productivities for catalysts supported on the PQ ES70 silica are indicated by reference number 110. The variation in productivity between the batches was about 30%. However, based on the higher productivity produced by ES70 that was equivalent to the standard at 7600 kg/kg. An additional batch of ES70 was made confirming the higher productivity. The results from the new batch tested at the second pilot plant confirmed that the higher productivity was correct productivity and that catalysts supported on ES70 silica provided productivities that were substantially equivalent to catalysts supported on standard ES757.

Figure 2:
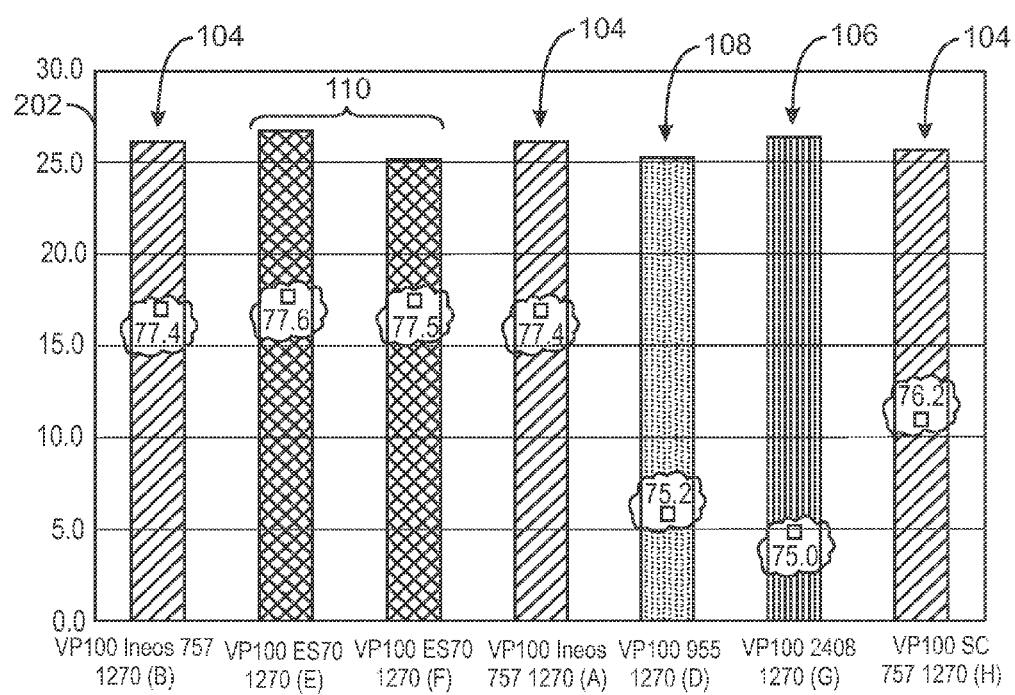
FIG. 2 is a bar chart showing the melt flow response (MFR) for each of the catalysts for the grade 1270 material.

FIG. 2 is a bar chart showing the melt flow response (MFR) for each of the catalysts for the grade 1270 material. Like numbered items are as described with respect to FIG. 1. The temperature used to reach the MFR shown is indicated as a separate data point within each bar. The MFR, represented on the y-axis 202, is calculated as the ratio of the high load melt index (HLMI) to the melt index (MI), using the procedures described herein. ES70 supported catalysts are comparable to the standard catalyst, although there may be slight differences requiring a somewhat lower T, e.g., about 1 to about 1.5° C. However, the 955 and 2408 supported catalysts have a lower MFR response requiring a 2.5 to 4° C. decrease in reactor temperature to produce equivalent MFR's.

Figure 3:
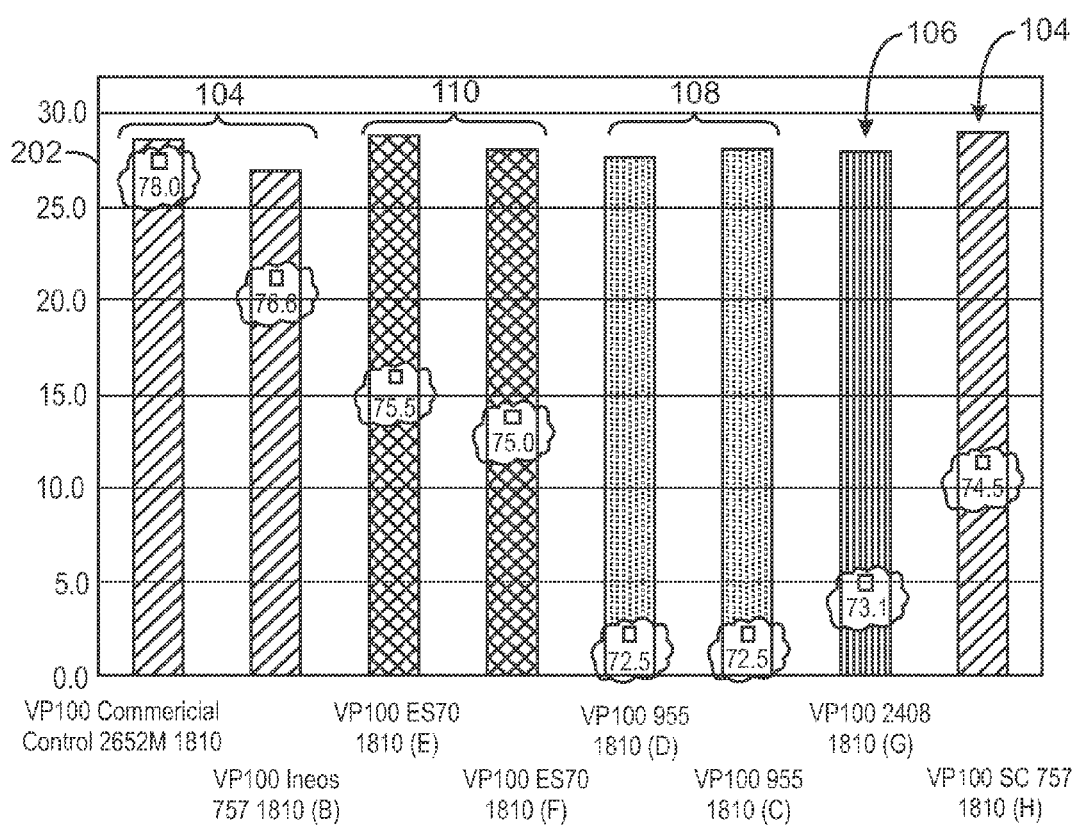
FIG. 3 is a bar chart showing the melt flow response (MFR) for each of the catalysts for the grade 1810 material.

FIG. 3 is a bar chart showing the melt flow response (MFR) for each of the catalysts for the grade 1810 material. Like numbered items are as described with respect to FIGS. 1 and 2. The temperature used to reach the MFR shown is indicated as a separate data point within each bar. Similar results were seen for this grade as for the grade 1270 material described with respect to FIG. 2.

TABLE 3A

Pilot plant results for catalyst runs for Grade 1810

| Part | 1E HfP Full Commercial Control | 3 PP HfP on commercial ES757 | 6 PP HfP on PP ES70 | 7 PP HfP on PP ES70 | 5 PP HfP on PP 955 | 4 PP HfP on PP 955 | 8 PP HfP on PP 2408 | 9 PP HfP on PP SC 757 |
|---|---|---|---|---|---|---|---|---|
| Catalyst | 2652M | 1810 (B) | 1810 (E) | 1810 (F) | 1810 (D) | 1810 (C) | 1810 (G) | 1810 (H) |
| Residence Time | 1.99 | 2.02 | 2.00 | 1.95 | 2.10 | 1.96 | 1.98 | 1.93 |
| H2/C2 | 5.48 | 5.20 | 5.34 | 5.51 | 4.91 | 4.99 | 5.04 | 5.48 |
| C6/C2 | 0.0131 | 0.0131 | 0.0150 | 0.0144 | 0.0124 | 0.0127 | 0.0124 | 0.0132 |
| Rx Temp (° C.) | 78 | 76.6 | 75.5 | 75.0 | 72.5 | 72.5 | 73.1 | 74.5 |
| MI (dg/min) | 0.974 | 1.02 | 0.95 | 0.93 | 1.03 | 1.01 | 1.10 | 1.00 |
| MFR | 28.6 | 27.0 | 28.8 | 28.1 | 27.7 | 28.1 | 28.0 | 28.9 |
| Density | 0.9178 | 0.9176 | 0.9182 | 0.9175 | 0.9185 | 0.9179 | 0.9188 | 0.9185 |
| APS (in) | 0.0221 | 0.0233 | 0.0307 | 0.0337 | 0.0357 | 0.0338 | 0.0325 | 0.0262 |
| 18 Mesh | 2 | 2.5 | 20.9 | 28.5 | 35.7 | 30.6 | 24.6 | 4.0 |
| 35 Mesh | 53.5 | 60.4 | 57.8 | 56.6 | 47.7 | 50.7 | 58.2 | 76.3 |
| 60 Mesh | 43.2 | 35.8 | 20.0 | 13.8 | 15.1 | 17.1 | 16.4 | 19.1 |
| Productivity (Material Balance) | 8370 | 8560 | 6012 | 8247 | 6476 | 4522 | 7951 | 9204 |
| Productivity (ICP) | 6729 | 7345 | 5425 | 7387 | 5267 | 3774 | 5852 | 7315 |
| Normalized Temperature for 28 MFR | | 76.0 | 76.1 | 75.1 | 72.3 | 72.5 | 73.1 | 75.1 |

PP = Pilot Plant

TABLE 3B

Pilot plant results for catalyst runs for Grade 1270

| Part | 3A PP HfP on Commercial ES757 | 6A PP HfP on PP ES70 | 7A PP HfP on PP ES70 | 2A PP HfP on Commercial ES757 | 5A PP HfP on PP 955 | 8A PP HfP on PP 2408 | 9A PP HfP on PP ES757 |
|---|---|---|---|---|---|---|---|
| Catalyst | 1270 (B) | 1270 (E) | 1270 (F) | 1270 (A) | 1270 (D) | 1270 (G) | 1270(H) |
| Residence Time | 2.03 | 2.00 | 1.97 | 1.95 | 2.02 | 1.98 | 1.92 |
| H2/C2 | 6.17 | 6.27 | 6.30 | 6.52 | 5.51 | 5.75 | 6.58 |
| C6/C2 | 0.0164 | 0.0165 | 0.0154 | 0.0161 | 0.0137 | 0.0135 | 0.0150 |
| Rx Temp | 77.4 | 77.6 | 77.5 | 77.4 | 75.2 | 75.0 | 76.2 |
| MI | 0.65 | 0.71 | 0.75 | 0.73 | 0.69 | 0.74 | 0.68 |
| MFR | 26.1 | 26.6 | 25.2 | 26.2 | 25.3 | 26.3 | 26.2 |
| Density | 0.9124 | 0.9119 | 0.9116 | 0.9117 | 0.9123 | 0.9118 | 0.9114 |

TABLE 3B-continued

Pilot plant results for catalyst runs for Grade 1270

| Part | 3A<br>PP HfP on<br>Commercial<br>ES757 | 6A<br>PP HfP on<br>PP ES70 | 7A<br>PP HfP on<br>PP ES70 | 2A<br>PP HfP on<br>Commercial<br>ES757 | 5A<br>PP HfP on<br>PP 955 | 8A<br>PP HfP on<br>PP 2408 | 9A<br>PP HfP on<br>PP ES757 |
|---|---|---|---|---|---|---|---|
| APS (in) | 0.0239 | 0.0308 | 0.0338 | 0.0246 | 0.0360 | 0.0334 | 0.0250 |
| 18 Mesh | 2.9 | 21.3 | 28.6 | 3.1 | 35.6 | 26.0 | 3.4 |
| 35 Mesh | 63.1 | 58.0 | 57.2 | 67.2 | 48.5 | 59.8 | 69.3 |
| 60 Mesh | 33.0 | 19.6 | 13.5 | 28.6 | 14.1 | 13.0 | 26.3 |
| Productivity (MB) | 7763 | 6012 | 8719 | 8625 | 6963 | 8195 | 9842 |
| Productivity (ICP) | 7801 | 5030 | 7736 | 7524 | 5411 | 5896 | 7596 |
| Normalized Temperature for 28 MFR | 77.5 | 78.0 | 76.9 | 77.5 | 74.7 | 75.2 | 76.3 |

PP = Pilot Plant

Figure 4:
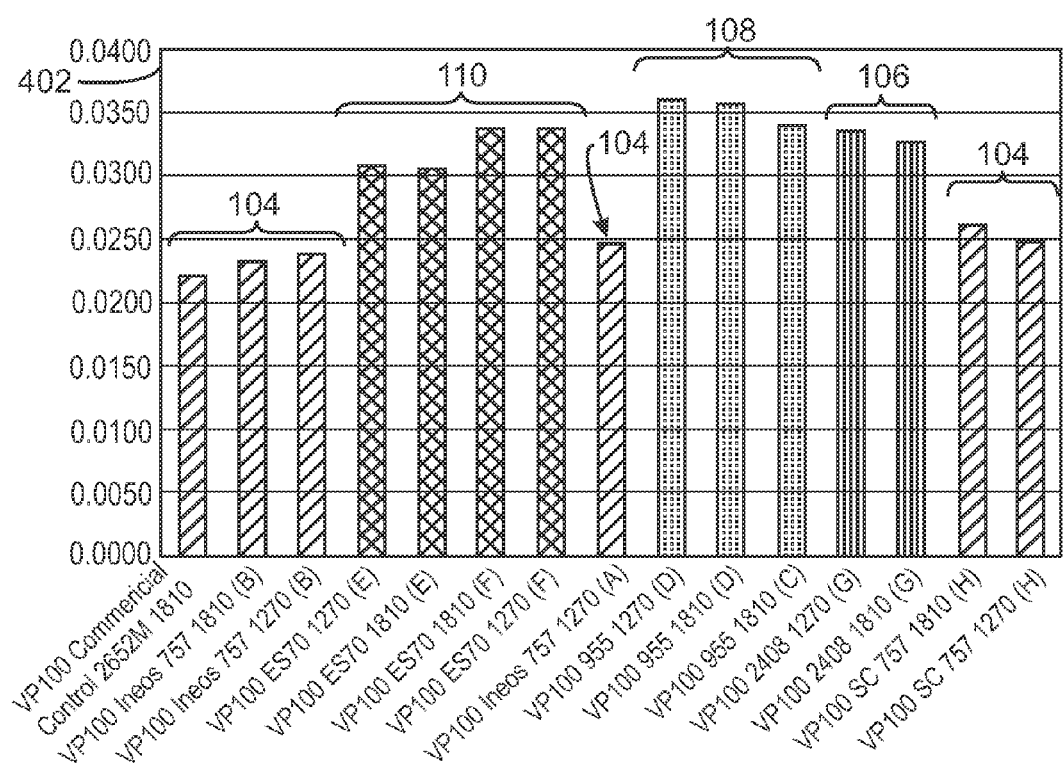
FIG. 4 is a bar chart showing the average particle size (APS) results for the catalysts tested.

FIG. 4 is a bar chart showing the average particle size (APS) results for the catalysts tested. The y-axis 402 represents the particle size in inches. Like numbered items are as described with respect to FIG. 1. The temperature used to reach the MFR shown is indicated as a separate data point within each bar. All of the new experimental supported catalysts gave an increase in particle size. ES70 had approximately a 30% increase, followed by 2408 at 40% increase, and 955 at 50% increase in APS. The changes in particle size are most significantly reflected by the amount of material left on 18 mesh and 60 mesh screens after sieving the polymer produced, as described with respect to FIGS. 5 and 6.

Figure 5:
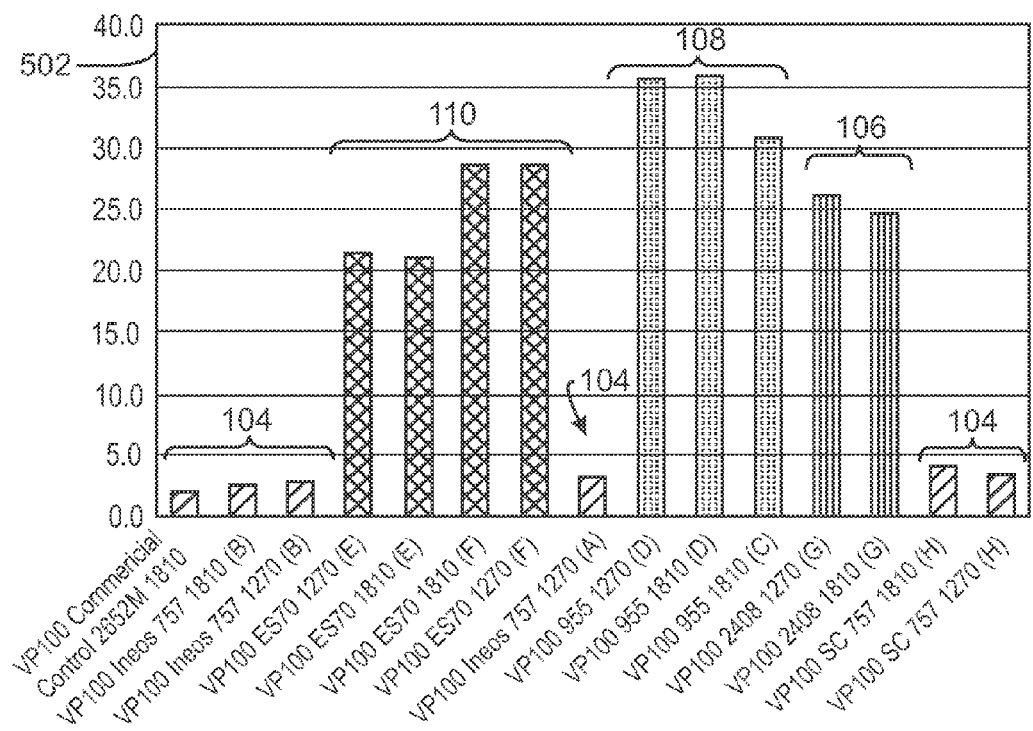
FIG. 5 is a bar chart showing the amount of material left on an 18 mesh sieve (about 1 mm openings).

FIG. 5 is a bar chart showing the amount of material left on an 18 mesh sieve (about 1 mm openings). The y-axis 502 represents the amount of material remaining as a percentage of the total material. Like numbered items are as described with respect to FIG. 1.

Figure 6:
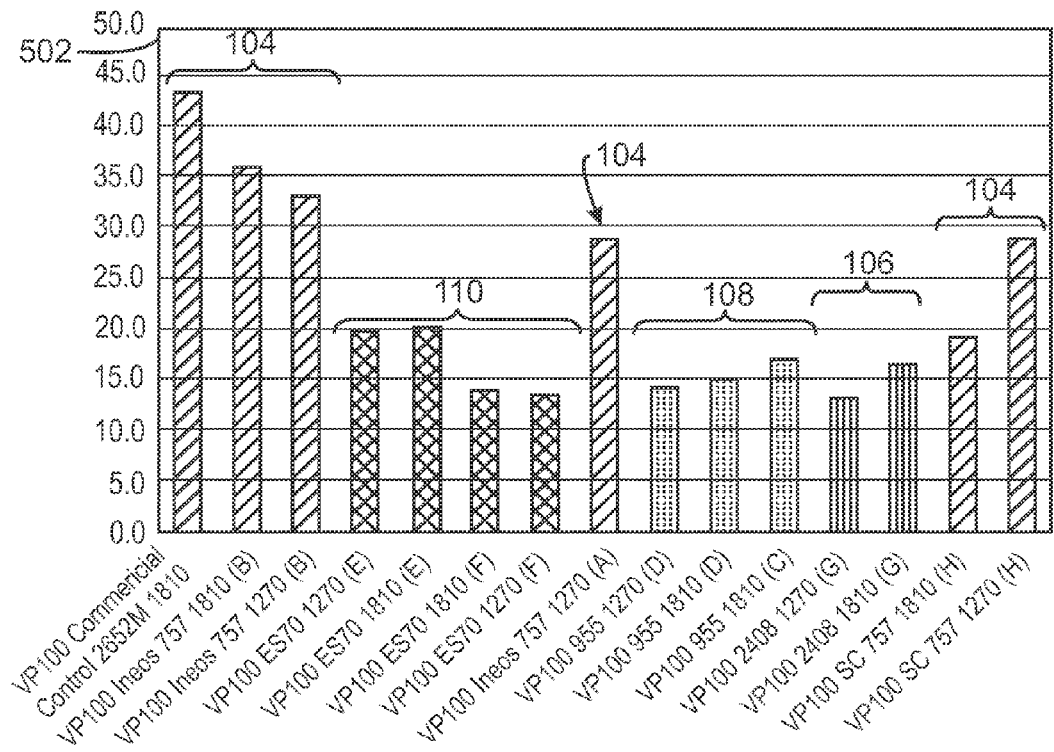
FIG. 6 is a bar chart showing the amount of material left on a 60 mesh sieve (about 0.25 mm openings).

FIG. 6 is a bar chart showing the amount of material left on a 60 mesh sieve (about 0.25 mm openings). Like numbered items are as described with respect to FIGS. 1 and 5. For the ES-70, Davison 955, and Davison 2408 catalyst supports, the weight percent decreased on the 60 mesh screen by approximately 40-50% and increased on the 18 mesh screen approximately 8-12 times more than the catalyst supported on the standard PQ ES757. The amounts retained on a 10 mesh (about 1.7 mm openings), a 35 mesh (about 0.400 mm opening) and fines screens (<120 mesh, <0.125 mm) were relatively unchanged.

Figure 7:
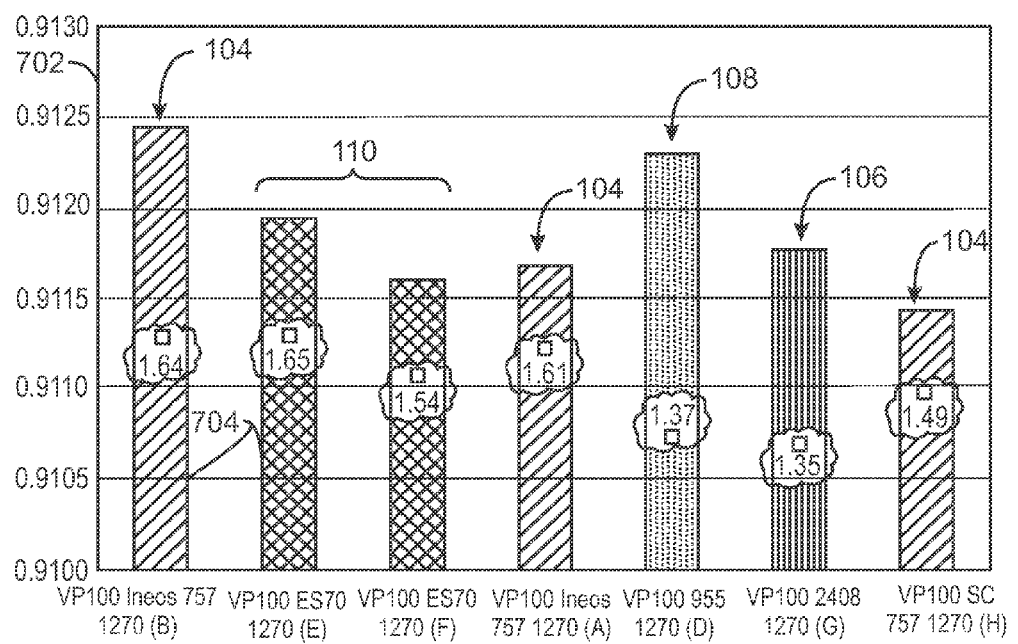
FIG. 7 is a bar chart of the hexene response for the 1270 grade.

FIG. 7 is a bar chart of the hexene response for the 1270 grade. The y-axis 702 represents the density of the polymer produced. Like numbered items are as described with respect to FIG. 1. The hexene to monomer ratio, multiplied by 100 for readability, is shown as the point in each bar. The data tends to indicate that the catalysts supported on the 955 silica and the 2408 silica require a lower C6/C2 ratio to make the same density as the standard. The standard catalyst, supported on the PQ ES757 and the catalyst supported on the ES70 are comparable.

Figure 8:
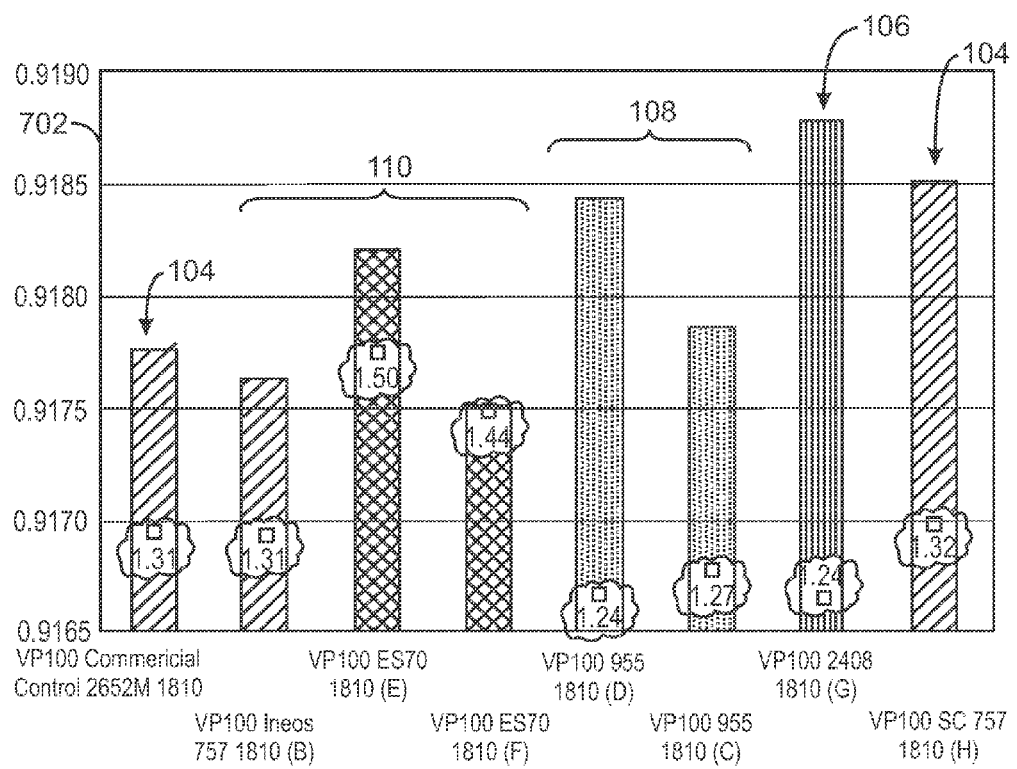
FIG. 8 is a bar chart of the hexene response for the 1810 grade.

FIG. 8 is a bar chart of the hexene response for the 1810 grade. Like numbered items are as described with respect to FIGS. 1 and 7. The hexene to monomer ratio, multiplied by 100 for readability, is shown as the point in each bar. For the first two standard runs, items 1E and 3 in Table 3A, the analyzer was determined to be off by about 15%. Accordingly, the C6/C2 ratio for those two resins is closer to 0.0150 instead of the 0.0131 ratio. The C6/C2 ratios for the catalysts supported on the ES70 and PQ ES757 are comparable. Further, the catalysts supported on the 955 and the 2408 require a lower C6/C2 ratio to make the same density as the standard, as determined with respect to FIG. 7.

Figure 9:
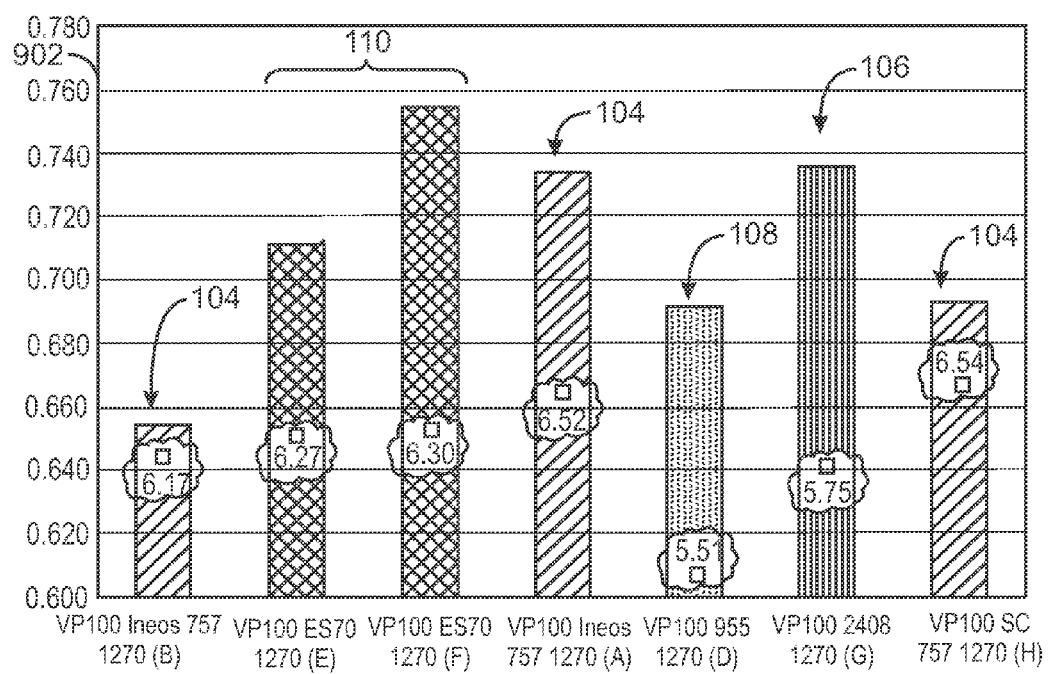
FIG. 9 is a bar chart of the hydrogen response for the 1270 grade.

FIG. 9 is a bar chart of the hydrogen response for the 1270 grade. The y-axis 902 represents the melt index (MI) of the resin produced. Like numbered items are as described with respect to FIG. 1. The hydrogen to monomer ratio used for each run is shown as the point inside the bar for that run.

Figure 10:
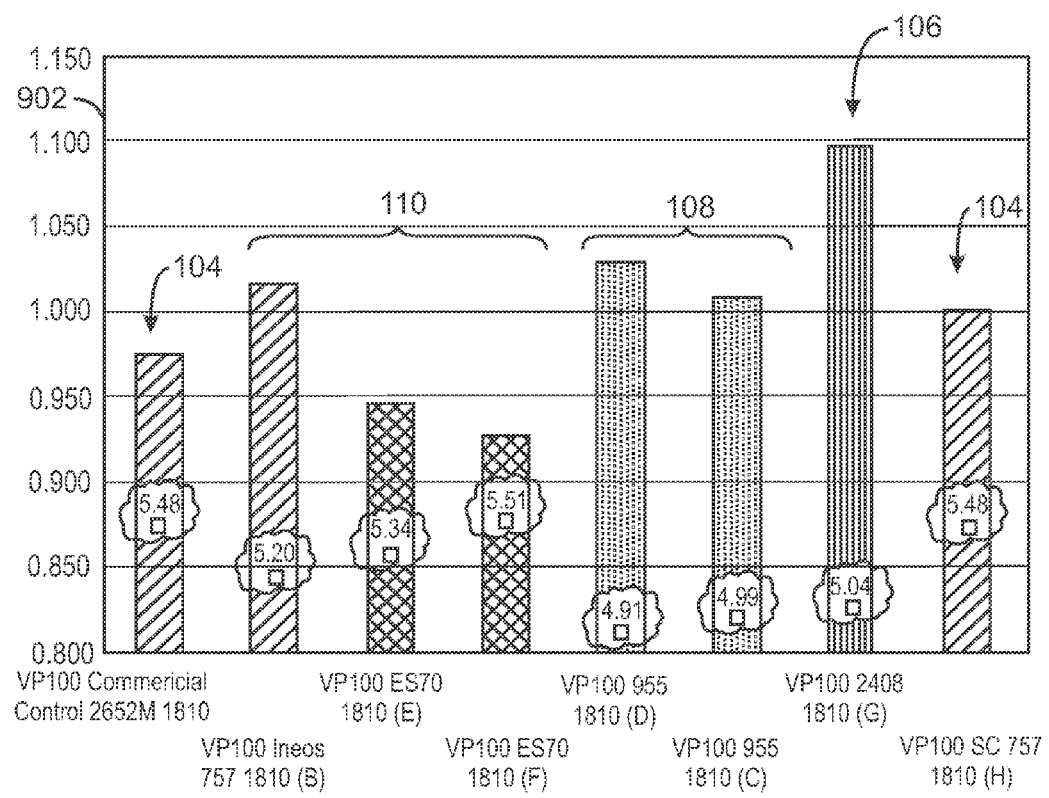
FIG. 10 is a bar chart of the hydrogen response for the 1810 grade.

FIG. 10 is a bar chart of the hydrogen response for the 1810 grade. Like numbered items are as described with respect to FIGS. 1 and 9. The hydrogen to monomer ratio used for each run is shown as the point inside the bar for that run. Data from both grades confirm that the hydrogen response, i.e., the response of the melt index to the H2/C2 ratio, for catalysts supported on the ES70 silica and the standard 757 silica are equivalent. However, catalysts supported with the 955 silica and the 2408 silica require less hydrogen to make the same MI.

Figure 11:
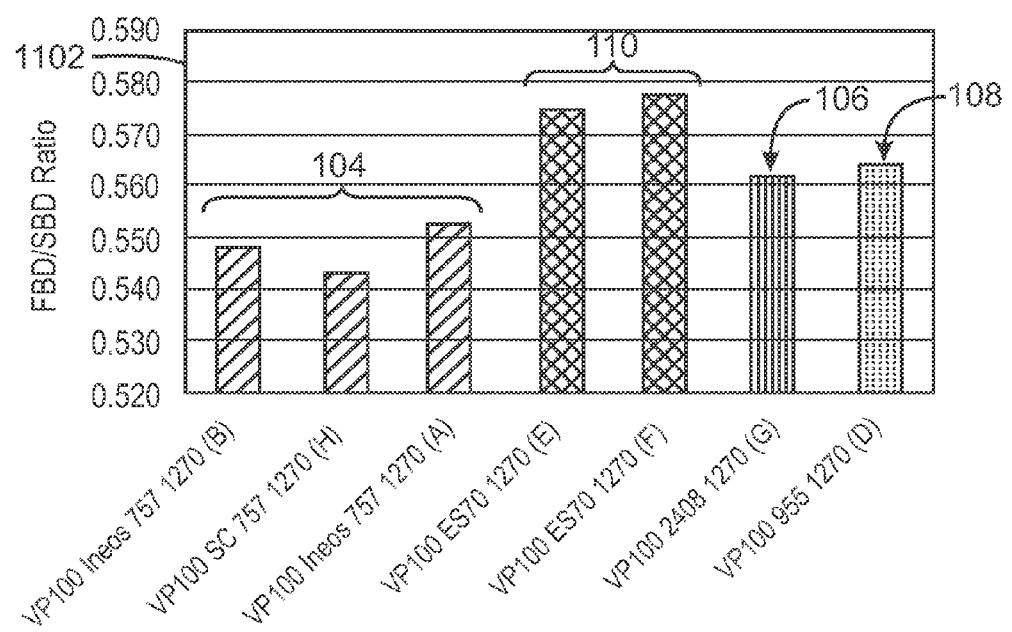
FIG. 11 is a bar chart of the ratio of the fluidized bulk density to the settled bulk density for the 1270 grade.

FIG. 11 is a bar chart of the ratio of the fluidized bulk density to the settled bulk density for the 1270 grade. The y-axis 1102 represents the ratio. Like numbered items are as described with respect to FIG. 1.

Figure 12:
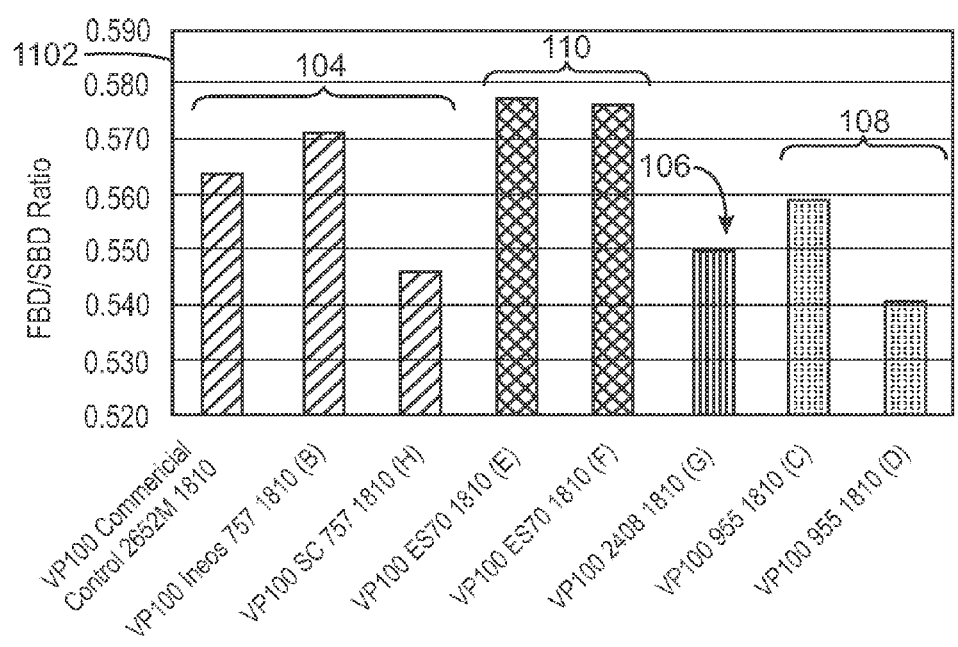
FIG. 12 is a bar chart of the ratio of the fluidized bulk density to the settled bulk density for the 1810 grade.

FIG. 12 is a bar chart of the ratio of the fluidized bulk density to the settled bulk density for the 1810 grade. Like numbered items are as described with respect to FIGS. 1 and 11. From this data, catalysts supported on the ES70 silica indicated an improved FBD/SBD ratio for both grades. The FBD/SBD ratio is related to the performance of a fluidized bed reactor, with a higher ratio providing better operability.

TABLE 4

FBD/SBD ratios for resin made with catalyst made on different supports.

| Catalyst Description | Min | Range | Max | Average |
|---|---|---|---|---|
| PP HfP Comm. ES757 1270 (A) | 0.549 | 0.008 | 0.558 | 0.553 |
| PP HfP Comm. ES757 1810 (B) | 0.568 | 0.004 | 0.572 | 0.570 |
| PP HfP Comm. ES757 1270 (B) | 0.537 | 0.025 | 0.562 | 0.549 |
| PP HfP PP 955 1810 (C) | 0.554 | 0.008 | 0.562 | 0.558 |
| PP HfP PP 955 1810 (D) | 0.530 | 0.021 | 0.552 | 0.541 |
| PP HfP PP 955 1270 (D) | 0.561 | 0.007 | 0.568 | 0.565 |
| PP HfP PP ES70 1810 (E) | 0.572 | 0.009 | 0.581 | 0.577 |
| PP HfP PP ES70 1270 (E) | 0.572 | 0.005 | 0.577 | 0.574 |
| PP HfP PP ES70 1810 (F) | 0.571 | 0.010 | 0.580 | 0.575 |
| PP HfP PP ES70 1270 (F) | 0.577 | 0.007 | 0.584 | 0.581 |
| PP HfP PP 2408 1810 (G) | 0.545 | 0.005 | 0.550 | 0.547 |
| PP HfP PP 2408 1270 (G) | 0.555 | 0.010 | 0.565 | 0.560 |
| PP HfP PP ES757 1810 (H) | 0.538 | 0.007 | 0.545 | 0.541 |
| PP HfP PP ES757 1270 (H) | 0.539 | 0.011 | 0.550 | 0.544 |

Note:
PP is an abbreviation for pilot plant and Comm is an abbreviation for commercial plant A further analysis of the data obtained from the pilot plant runs confirmed the difference in the FBD/SBD ratio for the alternate supports. The results are shown in Table 4 and are plotted in FIG. 13.

Figure 13:
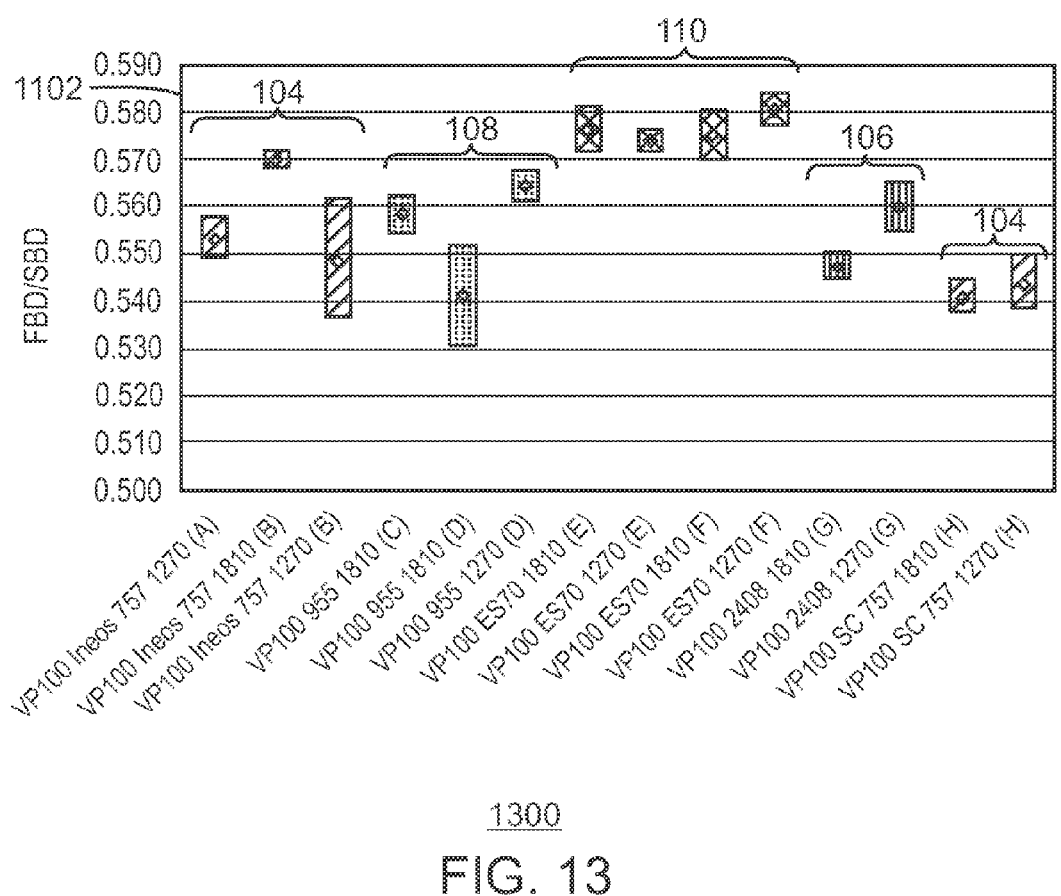
FIG. 13 is a bar chart illustrating a range for fluidized/settled bulk density ratio response for polymers made using catalysts supported on different spherical silica supports.

FIG. 13 is a bar chart illustrating a range for fluidized/settled bulk-density ratio response for polymers made using catalysts supported on different spherical silica supports. As can be seen in FIG. 13, the FBD/SBD response is measurably higher for catalyst supported on the PQ ES70 silica.

As shown by the data described above, as compared to the catalyst supported on the standard PQ ES757 silica, the catalyst supported on the PQ ES70 silica had equivalent productivity, H2/C2 and C6/C2 response, a 30% increase in APS, and a 4% increase in FBD/SBD. Further, the catalyst supported on the ES70 Silica made polymer with comparable MFR at a similar reactor temperature for catalysts supported on the ES757.

By comparison, the catalyst supported on the Davison 2408 silica had a productivity of about 20% less than the catalyst supported on the standard PQ ES757 silica. Although the APS was about 40% larger, the MFR response necessitated a 2.5° C. to 4° C. lower reactor temperature. This temperature decrease may impact overall production rates from the reactor. Further, the C6/C2 and H2/C2 responses required 10-15% lower ratios to achieve the same density and MI targets.

The catalyst supported on the Davison 955 silica had a 30-50% lower productivity than the catalyst supported on the standard PQ ES757 silica. The MFR response had the same issues as the Davison 2408 silica, necessitating a 2.5° C. to 4° C. lower reactor temperature to achieve the same response. The APS was about 50% larger, at about 0.0358 inches. Further, as for the Davison 2408 silica, the C6/C2 and H2/C2 responses required 10-15% lower ratios to achieve the same density and MI targets.

While the foregoing is directed to embodiments of the present invention, other and further embodiments of the invention can be devised without departing from the basic scope thereof, and the scope thereof is determined by the claims that follow.

What is claimed is:

1. A method for forming resin particles, comprising:
   forming a catalyst compound comprising hafnium;
   mixing the catalyst compound with an activator to form a catalyst complex; and
   combining the catalyst complex with a silica support to form a supported polymerization catalyst, wherein the supported polymerization catalyst has a productivity of at least about 7000 g polymer per g catalyst;
   reacting the supported polymerization catalyst with at least ethylene in a polymerization reactor to form resin particles, wherein the resin particles have:
   an average polymer particle size of at least about 0.660 mm;
   a size distribution of at least about 20% greater than 1 mm in diameter; and
   a ratio of fluidized bulk density to settled bulk density (FBD/SBD) of at least about 0.570.

2. The method of claim 1, wherein forming the supported polymerization catalyst includes
   mixing bis(n-propylcyclopentadienyl) hafnium $(CH_3)_2$ with methylaluminoxane to form the catalyst complex; and
   drying the supported catalyst to bind the catalyst complex to the silica support.

3. The method of claim 1, further comprising adding a comonomer to the polymerization reactor to control density of the resin particles.

4. The method of claim 1, wherein the resin particles comprise a polymer having about a 0.7 dg/min MI, about a 0.912 $g/cm^3$ density, and about a 26 MFR at a temperature of the polymerization reactor of at least about 77° C.

5. The method of claim 1, wherein the resin particles comprise a polymer having about a 1 dg/min MI, about a 0.918 $g/cm^3$ density, and about a 28 MFR at a temperature of the polymerization reactor of at least about 75° C.

6. The method of claim 1, further comprising adding hydrogen to the fluidized bed reactor to control a melt index of the resin particles.

7. The method of claim 1, wherein the polymerization reactor is a fluidized bed gas phase reactor.

8. The method of claim 1, further comprising:
   measuring a sample of the resin particles to obtain an initial product property; and
   changing a process parameter to obtain a second product property, based, at least in part, on the initial product property.

9. The method of claim 8, wherein measuring a sample comprises determining a physical property of a plastic sample.

10. The method of claim 8, wherein measuring a sample comprises determining a physical property of a plastic sample.

11. The method of claim 3, comprising adjusting a ratio of the comonomer to ethylene within the polymerization reactor to control at least one of the composition distribution, the molecular weight distribution, and the melt index ($I_2$) of a polyethylene.

12. The method of claim 6, comprising adjusting a ratio of the hydrogen to ethylene within the polymerization reactor to control at least one of the composition distribution, the molecular weight distribution, and the melt index ($I_2$) of a polyethylene.

* * * * *